(12) United States Patent
Zhang et al.

(10) Patent No.: US 11,580,779 B2
(45) Date of Patent: Feb. 14, 2023

(54) VERIFICATION SYSTEM, ELECTRONIC DEVICE, AND VERIFICATION METHOD

(71) Applicant: GUANGDONG OPPO MOBILE TELECOMMUNICATIONS CORP., LTD., Guangdong (CN)

(72) Inventors: Xueyong Zhang, Guangdong (CN); Xiangnan Lyu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 623 days.

(21) Appl. No.: 16/682,728

(22) Filed: Nov. 13, 2019

(65) Prior Publication Data

US 2020/0125832 A1 Apr. 23, 2020

Related U.S. Application Data

(63) Continuation of application No. PCT/CN2019/083481, filed on Apr. 19, 2019.

(30) Foreign Application Priority Data

| May 29, 2018 | (CN) | 201810529846.2 |
| May 29, 2018 | (CN) | 201810531274.1 |
| Jun. 19, 2018 | (CN) | 201810630946.4 |

(51) Int. Cl.
  *G06V 40/16* (2022.01)
  *G06T 7/557* (2017.01)
  *G06F 21/32* (2013.01)

(52) U.S. Cl.
  CPC ............ *G06V 40/166* (2022.01); *G06F 21/32* (2013.01); *G06T 7/557* (2017.01); *G06V 40/172* (2022.01);

(Continued)

(58) Field of Classification Search
  USPC .......... 726/19, 2, 21, 36; 713/150, 163, 181; 380/255, 264, 276
  See application file for complete search history.

(56) References Cited

U.S. PATENT DOCUMENTS

| 32,017 A | * | 4/1861 | Turner et al. ............ B07B 1/38 |
| | | | 209/365.2 |
| 32,019 A | * | 4/1861 | Walker et al. ............ C10B 1/04 |
| | | | 202/217 |

(Continued)

FOREIGN PATENT DOCUMENTS

| CN | 102273191 A | 12/2011 |
| CN | 102741887 A | 10/2012 |

(Continued)

OTHER PUBLICATIONS

Communication pursuant to Article 94(3) EPC for EP Application 19794400.2 dated Dec. 23, 2021. (5 pages).

(Continued)

*Primary Examiner* — Sharif E Ullah
(74) *Attorney, Agent, or Firm* — Young Basile Hanlon & MacFarlane, P.C.

(57) ABSTRACT

The present disclosure provides a verification system. The verification system is formed with a trusted execution environment, the verification system includes a processor set, and the processor set is configured to: obtain an infrared image to be verified of a target object; determine, in the trusted execution environment, whether the infrared image to be verified matches a pre-stored infrared template; in response to determining that the infrared image to be verified matches the pre-stored infrared template, obtain a depth image to be verified of the target object; and determine, in the trusted execution environment, whether the depth image to be verified matches a pre-stored depth template.

17 Claims, 12 Drawing Sheets

(52) U.S. Cl.
CPC ............... *G06T 2207/10048* (2013.01); *G06T 2207/30201* (2013.01)

(56) References Cited

U.S. PATENT DOCUMENTS

| | | | | |
|---|---|---|---|---|
| 42,013 | A * | 3/1864 | Muzzey | B65D 90/026 217/4 |
| 42,016 | A * | 3/1864 | Norton | A47D 1/106 297/174 CS |
| 42,018 | A * | 3/1864 | Peak et al. | A61G 17/0076 27/5 |
| 52,018 | A * | 1/1866 | Blinn | E06B 9/24 160/133 |
| 62,014 | A * | 2/1867 | Crum | B68B 3/00 69/3 |
| 62,017 | A * | 2/1867 | Davis | A43B 13/34 36/40 |
| 72,016 | A * | 12/1867 | Glass | A01D 43/02 56/171 |
| 72,018 | A * | 12/1867 | Goodwin | A01B 35/02 172/691 |
| 82,013 | A * | 9/1868 | Lyman | A01L 7/04 168/29 |
| 82,015 | A * | 9/1868 | Mattson | A61M 1/06 604/75 |
| 82,017 | A * | 9/1868 | McNeil | B21D 1/06 72/482.94 |
| 82,018 | A * | 9/1868 | Metzler | A47C 11/00 297/244 |
| 102,015 | A * | 4/1870 | King | B66D 3/06 254/394 |
| 102,018 | A * | 4/1870 | Krepps | B03B 9/061 202/168 |
| 112,018 | A * | 2/1871 | Coffin | F16L 59/12 138/147 |
| 122,015 | A * | 12/1871 | Hemingray | C03B 19/04 65/316 |
| 122,017 | A * | 12/1871 | Hollis | D01G 7/04 19/80 R |
| 8,381,969 | B1 * | 2/2013 | Miller | G06Q 20/382 235/375 |
| 9,369,870 | B2 * | 6/2016 | Varadarajan | H04W 12/08 |
| 11,113,510 | B1 * | 9/2021 | Mostafa | G06F 21/32 |
| 2006/0059557 | A1 * | 3/2006 | Markham | G08B 29/188 726/22 |
| 2006/0213982 | A1 * | 9/2006 | Cannon | G06K 7/0013 235/380 |
| 2007/0061590 | A1 * | 3/2007 | Boye | G06F 21/305 713/186 |
| 2008/0018451 | A1 * | 1/2008 | Slibeck | G07C 9/257 340/552 |
| 2008/0162943 | A1 * | 7/2008 | Ali | H04L 9/3234 713/185 |
| 2008/0178008 | A1 * | 7/2008 | Takahashi | G07C 9/257 713/186 |
| 2009/0183008 | A1 * | 7/2009 | Jobmann | G06F 21/34 235/382 |
| 2010/0275258 | A1 * | 10/2010 | Kamakura | G06K 9/6277 726/19 |
| 2011/0246817 | A1 * | 10/2011 | Orsini | G06F 21/6227 714/E11.062 |
| 2012/0331557 | A1 * | 12/2012 | Washington | G06Q 20/4016 726/26 |
| 2017/0351905 | A1 * | 12/2017 | Wang | G06V 40/171 |
| 2018/0007060 | A1 * | 1/2018 | Leblang | H04L 63/107 |
| 2019/0036939 | A1 * | 1/2019 | Johansson | G06F 21/6245 |
| 2019/0050866 | A1 * | 2/2019 | Wang | G06Q 20/40145 |
| 2020/0257893 | A1 * | 8/2020 | Trani | G06V 40/172 |

FOREIGN PATENT DOCUMENTS

| | | |
|---|---|---|
| CN | 103400108 A | 11/2013 |
| CN | 104700268 A | 6/2015 |
| CN | 105335722 A | 2/2016 |
| CN | 105432079 A | 3/2016 |
| CN | 105513221 A | 4/2016 |
| CN | 106056380 A | 10/2016 |
| CN | 106210568 A | 12/2016 |
| CN | 106226977 A | 12/2016 |
| CN | 106991377 A | 7/2017 |
| CN | 107609383 A | 1/2018 |
| CN | 107633165 A | 1/2018 |
| CN | 107748869 A | 3/2018 |
| CN | 107832677 A | 3/2018 |
| CN | 107844744 A | 3/2018 |
| CN | 107844773 A | 3/2018 |
| CN | 107992729 A | 5/2018 |
| CN | 108763902 A | 11/2018 |
| CN | 108763903 A | 11/2018 |
| WO | 2015003522 A1 | 1/2015 |

OTHER PUBLICATIONS

Office Action with English translation for CN application 201810531274.1.

Indian Examination Report for IN Application 201917044414 dated Aug. 27, 2021. (7 pages).

Decision of Rejection from SIPO with English translation for CN application 201810529846.2 dated Jul. 26, 2019.

Zhang Wenjun et al. "Copyright Management of Digital New Media" p. 155-157 (Jun. 30, 2014).

OA with English translation for CN application 201810529846.2 dated Feb. 12, 2019.

OA with English translation for CN application 201810529846.2 dated Apr. 18, 2019.

OA with English translation for CN application 201810531274.1 dated Feb. 19, 2019.

OA with English translation for CN application 201810531274.1 dated May 8, 2019.

OA with English translation for CN application 201810531274.1 dated Jul. 26, 2019.

ISR with English translation for PCT application PCT/CN2019/083481, dated May 31, 2019.

EP Search report for EP application 19794400.2 dated Jun. 23, 2020.

Face ID Security; Apple Inc.; Nov. 2017; pp. 1-6.

\* cited by examiner

VERIFICATION SYSTEM, ELECTRONIC DEVICE, AND VERIFICATION METHOD

CROSS-REFERENCE TO RELATED APPLICATION(S)

This application is a continuation of International Application No. PCT/CN2019/083481, filed on Apr. 19, 2019, which claims priority to Chinese Patent Application Serial No. 201810529846.2 and 201810531274.1, filed on May 29, 2018, and Chinese Patent Application Serial No. 201810630946.4, filed on Jun. 19, 2018, the content of all of which are incorporated herein by reference in their entireties.

TECHNICAL FIELD

The present disclosure relates to a field of information security technology, and more particularly to a verification system, an electronic device, and a verification method.

BACKGROUND

In the related art, an electronic device generally verifies whether a use has a relevant usage right by comparing a difference between a facial image input by the user and a pre-stored facial image template.

SUMMARY

Embodiments of the present disclosure provide a verification system, an electronic device, a verification method, a computer readable storage medium, and a computer device.

Embodiments of the present disclosure provide a verification system. The verification system is formed with a trusted execution environment. The verification system includes a processor set. The processor set is configured to: obtain an infrared image to be verified of a target object; determine, in the trusted execution environment, whether the infrared image to be verified matches a pre-stored infrared template; in response to determining that the infrared image to be verified matches the pre-stored infrared template, obtain a depth image to be verified of the target object; and determine, in the trusted execution environment, whether the depth image to be verified matches a pre-stored depth template.

Embodiments of the present disclosure provide an electronic device. The electronic device includes: an infrared camera, a laser projector, and the verification system according to embodiments of the present disclosure. The infrared camera is configured to collect an infrared image of a target object. The laser projector is configured to project laser light to the target object. The processor set is coupled to both the infrared camera and the laser projector.

Embodiments of the present disclosure provide a verification method. The verification method includes: obtaining an infrared image to be verified of a target object; determining, in a trusted execution environment, whether the infrared image to be verified matches a pre-stored infrared template; in response to determining that the infrared image to be verified matches the pre-stored infrared template, obtaining a depth image to be verified of the target object; determining, in the trusted execution environment, whether the depth image to be verified matches a pre-stored depth template; and in response to determining that the depth image to be verified matches the pre-stored depth template, determining that the verification is successful.

Embodiments of the present disclosure provide a computer readable storage medium. One or more non-transitory computer readable storage medium includes one or more computer executable instructions that, when executed by one or more processors, cause the processors to perform the verification method according to embodiments of the present disclosure.

Embodiments of the present disclosure provide a computer device. The computer device includes a memory and a processor. The memory is stored thereon with computer readable instructions that, when executed by the processor, cause the processor to perform the verification method according to embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

These and other aspects and advantages of embodiments of the present disclosure will become apparent and more readily appreciated from the following descriptions made with reference to the drawings, in which.

DETAILED DESCRIPTION

Figure 1:
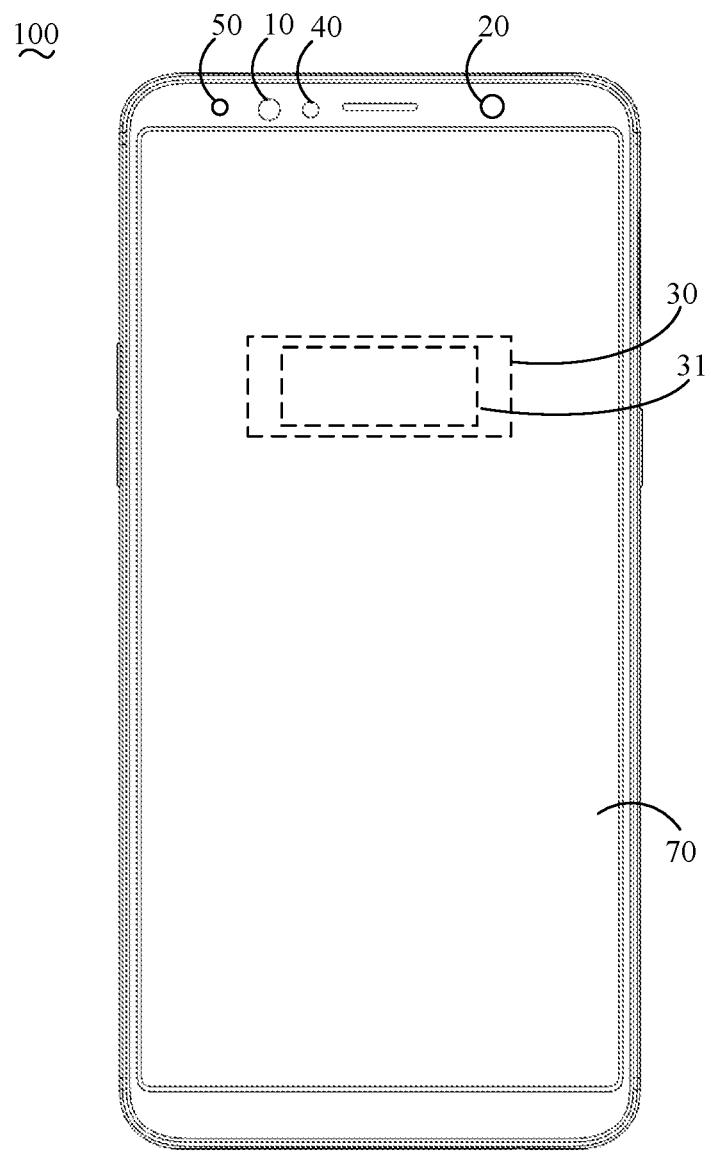
FIG. 1 is a schematic diagram illustrating structure of an electronic device according to an embodiment of the present disclosure.

Description will be further made to embodiments of the present disclosure with reference to drawings. The same or similar elements and the elements having same or similar functions are denoted by like reference numerals throughout the descriptions.

In addition, the embodiments described herein according to drawings are explanatory and illustrative, not construed to limit the present disclosure.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the related arts, the facial image template is easy to be tampered or stolen, resulting in lower security of information within the electronic device.

Therefore, embodiments of the present disclosure provide a verification system, an electronic device, a verification method, a computer readable storage medium, and a computer device.

As illustrated in FIG. 1, the embodiments of the present disclosure provide an electronic device 100. The electronic device 100 includes an infrared camera 10, a laser projector 20, and a verification system 30. The infrared camera 10 is configured to collect an infrared image of a target object. The laser projector 20 is configured to project laser light to the target object.

The verification system 30 is formed with a trusted execution environment (TEE) 32. The verification system 30 includes a processor set 31. The processor set 31 is coupled to the infrared camera 10. The processor set 31 is coupled to the laser projector 20. Two ports of the processor set 31 are respectively coupled to the infrared camera 10 and the laser projector 20. The processor set 31 is configured to: obtain an infrared image to be verified of a target object; determine, in the trusted execution environment 32, whether the infrared image to be verified matches a pre-stored infrared template; in response to determining that the infrared image to be verified matches the pre-stored infrared template, obtain a depth image to be verified of the target object; and determine, in the trusted execution environment 32, whether the depth image to be verified matches a pre-stored depth template.

With the electronic device 100 according to the embodiments of the present disclosure, it is determined in the trusted execution environment 32 whether the infrared image to be verified matches the infrared template, and it is determined whether the depth image to be verified matches the depth template, the infrared image to be verified, the infrared template, the depth image to be verified, and the depth template are difficult to be tampered or stolen during the process of determining whether the match is successful, thus security of the information in the electronic device 100 is relatively high.

The electronic device 100 according to the embodiments of the present disclosure will be described in the following three portions of the embodiments.

First Portion of Embodiments

Figure 2:
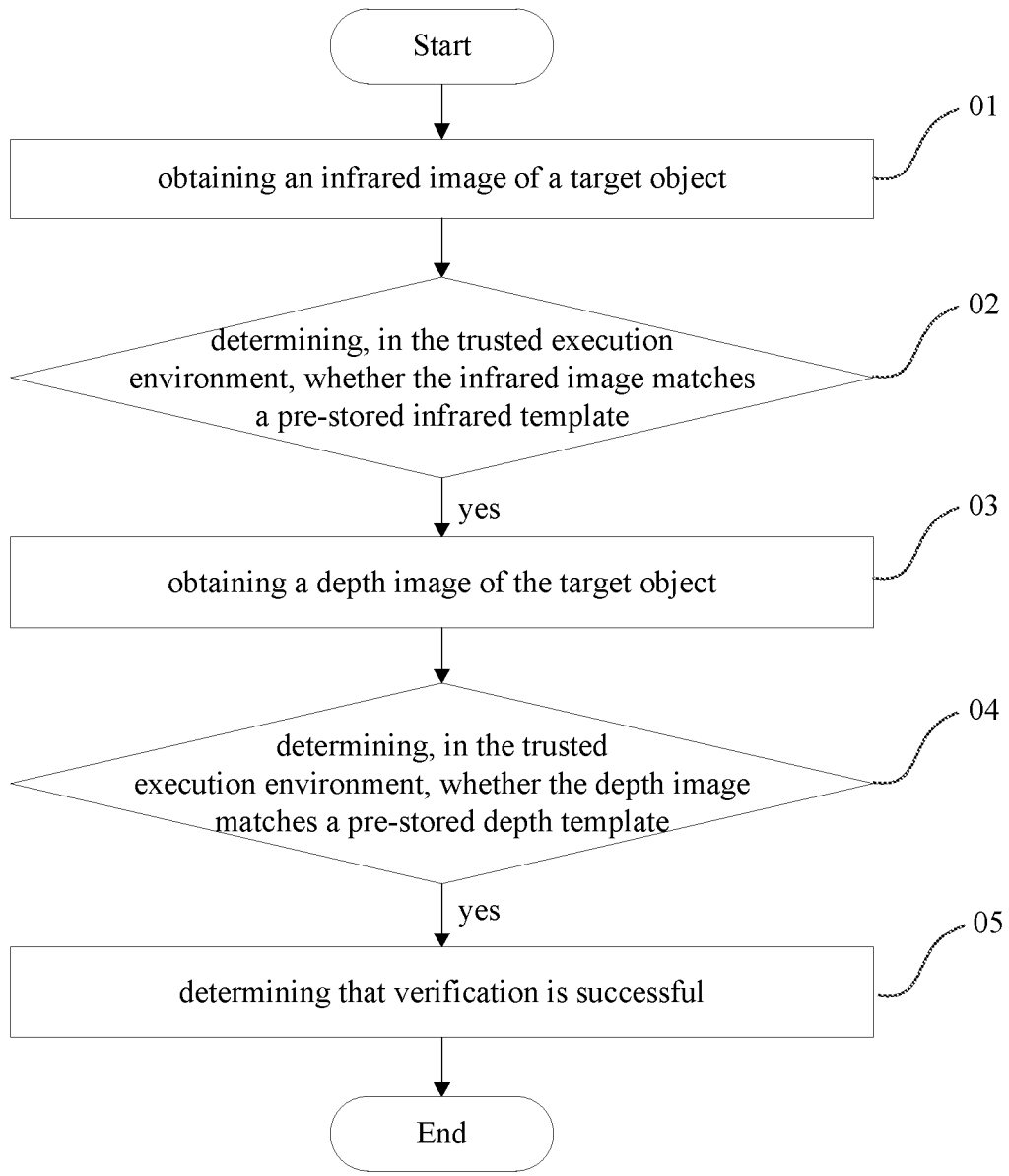
FIG. 2 is a flow chart of a verification method according to an embodiment of the present disclosure.

As illustrated in FIG. 2, the embodiments of the present disclosure provide a verification method. The verification method includes the following actions.

At block 01, an infrared image to be verified of a target object is obtained.

At block 02, it is determined, in the trusted execution environment, whether the infrared image to be verified matches a pre-stored infrared template.

At block 03, in response to determining that the infrared image to be verified matches the pre-stored infrared template, a depth image to be verified of the target object is obtained.

At block 04, it is determined, in the trusted execution environment, whether the depth image to be verified matches a pre-stored depth template.

At block 05, in response to determining that the depth image to be verified matches the pre-stored depth template, it is determined that the verification is successful.

Figure 3:
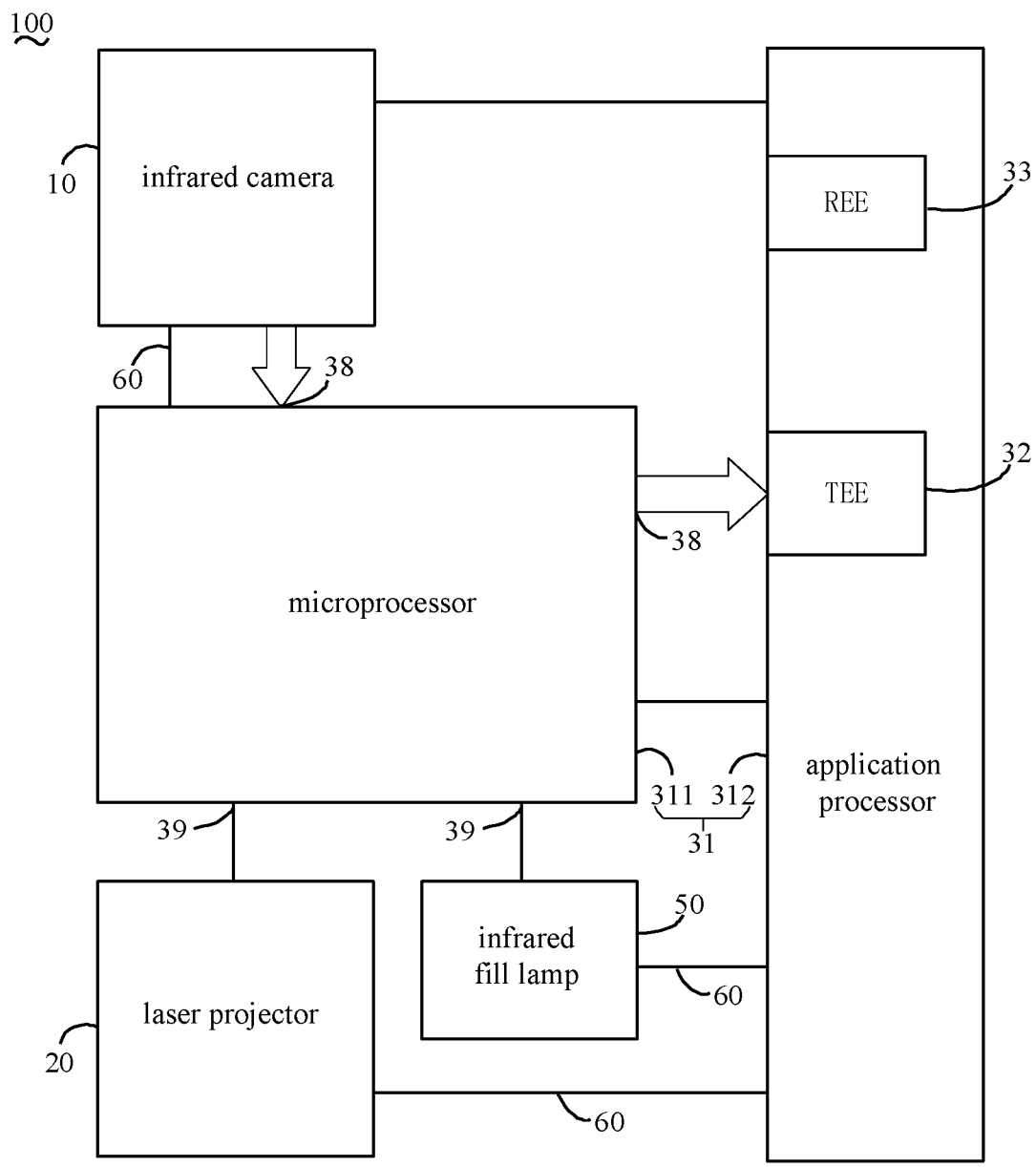
FIG. 3 is a block diagram illustrating an electronic device according to an embodiment of the present disclosure.

As illustrated in FIG. 3, the electronic device 100 according to the embodiments of the present disclosure includes an infrared camera 10, a laser projector 20, and a verification system 30. The infrared camera 10 may be configured to collect an infrared image of a target object. The laser projector 20 may be configured to project laser light to the target object. The verification system 30 includes a processor set 31. The processor set 31 includes an application processor 312 and a microprocessor 311. The application processor 312 may be formed with a trusted execution environment 32. The microprocessor 311 may be configured to implement actions at blocks 01 and 03. The application processor 312 may be configured to implement actions at blocks 02, 04 and 05. That is, the microprocessor 311 may be configured to obtain the infrared image to be verified of the target object. The application processor 312 may be configured to determine, in the trusted execution environment 32, whether the infrared image to be verified matches the pre-stored infrared template. In response to determining that the infrared image to be verified matches the pre-stored infrared template, the microprocessor 311 may be further configured to obtain the depth image to be verified of the target object. The application processor 312 may be configured to determine, in the trusted execution environment 32, whether the depth image to be verified matches a pre-stored depth template. In response to determining that the depth image to be verified matches the pre-stored depth template, the verification is successful.

In detail, the electronic device 100 may be a mobile phone, a tablet computer, a smart watch, a smart bracelet, a smart wearable device, and the like. In the embodiments of the present disclosure, for example, the electronic device 100 is the mobile phone. It can be understood that, a specific form of the electronic device 100 is not limited to be the mobile phone. The infrared image to be verified of the target object may be collected by the infrared camera 10. The infrared camera 10 may be coupled to the application processor 312. The application processor 312 may be configured to control the power of the infrared camera 10 to switch on or off, to power down the infrared camera 10, or to reset the infrared camera 10. At the same time, the infrared camera 10 may also be coupled to the microprocessor 311. The microprocessor 311 and the infrared camera 10 may be coupled to each other via an inter-integrated circuit (I2C) bus 60. The microprocessor 311 may provide the infrared camera 10 with the clock information for collecting the infrared image to be verified. The infrared image to be verified collected by the infrared camera 10 may be transmitted to the microprocessor 311 via a mobile industry processor interface (MIPI) 38. In an embodiment of the present disclosure, the electronic device 100 further includes an infrared fill lamp 50. The infrared fill lamp 50 may be configured to emit infrared light. The infrared light is reflected by the user and then received by the infrared camera 10. The infrared fill lamp 50 may be coupled to the application processor 312 via the inter-integrated circuit bus 60. The application processor 312 may be configured to enable the infrared fill lamp 50. The infrared fill lamp 50 may also be coupled to the microprocessor 311. In detail, the infrared fill lamp 50 may be coupled to a pulse width modulation (PWM) interface 39 of the microprocessor 311.

The laser projector 20 of the electronic device 100 may project laser light to the target object. The laser projector 20 may be coupled to the application processor 312. The application processor 312 may be configured to enable the laser projector 20 and be coupled to the laser projector 20 via the inter-integrated circuit bus 60. The laser projector 20 may also be coupled to the microprocessor 311. In detail, the laser projector 20 may be coupled to the pulse width modulation interface 39 of the microprocessor 311.

The microprocessor 311 may be a processing chip. The microprocessor 311 is coupled to the application processor 312. In detail, the application processor 312 may be configured to reset the microprocessor 311, to wake up the microprocessor 311, to debug the microprocessor 311, and the like. The microprocessor 311 may be coupled to the application processor 312 via the mobile industry processor interface 38. In detail, the microprocessor 311 is coupled to the trusted execution environment 32 of the application processor 312 via the mobile industry processor interface 38, to directly transmit data in the microprocessor 311 to the trusted execution environment 32. Codes and a memory area in the trusted execution environment 32 are controlled by an access control unit and are inaccessible to a program in the rich execution environment (REE) 33. Both the trusted execution environment 32 and the rich execution environment 33 may be formed in the application processor 312.

The infrared template and the depth template may be verification templates input to the electronic device 100 by a user in advance and pre-stored in the trusted execution environment 32 before the verification. In an embodiment of the present disclosure, the infrared template may be a facial infrared image of the user, and the facial infrared image may be a flat image. The depth template may be a facial depth image of the user. The facial depth image may be obtained by means of structured light detection.

The microprocessor 311 may obtain the infrared image to be verified by receiving the infrared image to be verified collected by the infrared camera 10. The microprocessor 311 may transmit the infrared image to be verified to the trusted execution environment 32 via the mobile industry processor interface 38. The infrared image to be verified output by the microprocessor 311 may not enter the rich execution environment 33 of the application processor 312, thus the infrared image to be verified may not be obtained by other program, improving information security of the electronic device 100.

When the application processor 312 determines that the infrared image to be verified matches the pre-stored infrared template, it can be considered that the flat image currently input by the user and the flat image input at the time of entry are from a same user. However, since both the infrared template and the infrared image to be verified are flat images, the infrared image to be verified is easy to be forged. For example, a 2D photo may be used for verification. Therefore, by further determining whether the depth image to be verified of the target object matches the depth template, it is possible to better verify whether the current user is the user when the verification template is entered. After the microprocessor 311 obtains the depth image to be verified of the target object, the depth image to be verified may be transmitted to the trusted execution environment 32 via the mobile industry processor interface 38. The depth image to be verified output by the microprocessor 311 may not enter the rich execution environment 33 of the application processor 312, thereby the depth image may not be obtained by other programs, improving information security of the electronic device 100. At the same time, the application processor 312 may compare in the trusted execution environment 32 whether the depth image to be verified matches the depth template, and then output the comparison result of whether the depth image to be verified matches the depth template. During the process of comparing whether the depth image to be verified matches the depth template, the depth image to be verified and the depth template are difficult to be obtained, tampered or stolen by other programs, further improving information security of the electronic device 100. When the application processor 312 determines that the depth image to be verified matches the depth template, the verification is successful. After the user passes the verification, relevant operation authorities, such as unlocking the screen, payment, etc., at the electronic device 100 are obtained.

In conclusion, in the verification method and the electronic device 100 according to the embodiments of the present disclosure, it is determined in the trusted execution environment 32 whether the infrared image to be verified matches the infrared template and whether the depth image to be verified matches the depth template, during the process of matching, the infrared image to be verified, the infrared template, the depth image to be verified, and the depth template are difficult to be tampered or stolen, thus the security of information in the electronic device 100 is relatively high.

Figure 4:
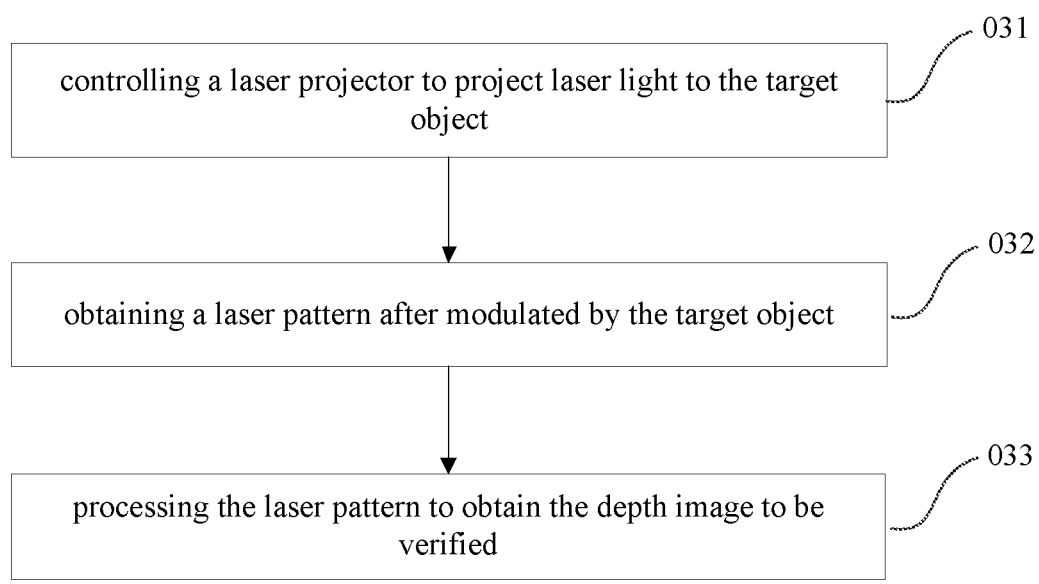
FIG. 4 is a flow chart of a verification method according to an embodiment of the present disclosure.

As illustrated in FIG. 4, in some embodiments, the action at block 03 includes the following actions.

At block 031, a laser projector 20 is controlled to project laser light to the target object.

At block 032, a laser pattern after modulated by the target object is obtained.

At block 033, the laser pattern is processed to obtain the depth image to be verified.

In some embodiments, the microprocessor 311 may be configured to implement actions at blocks 031, 032, and 033. That is, the microprocessor 311 may be configured to control the laser projector 20 to project the laser light to the target object, obtain the laser pattern after modulated by the target object, and process the laser pattern to obtain the depth image to be verified.

In detail, after the microprocessor 311 controls the laser projector 20 to project the laser light to the target object, the microprocessor 311 may further control the infrared camera 10 to collect the laser pattern after modulated by the target object. Then the microprocessor 311 obtains the laser pattern via the mobile industry processor interface 38. The microprocessor 311 processes the laser pattern to obtain the depth image to be verified. In detail, calibration information of the laser light projected by the laser projector 20 may be stored in the microprocessor 311. The microprocessor 311 obtains the depth information at different positions of the target object by processing the laser pattern and the calibration information, and the depth image to be verified is formed. After the depth image to be verified is obtained, the depth image to be verified is transmitted to the trusted execution environment 32 via the mobile industry processor interface 38 to be compared with the depth template. The laser light projected by the laser projector 20 may be infrared light. The laser patterns after modulated by different materials are different when the laser light is projected onto different materials. For example, when the laser light is projected onto materials such as human skin, rubber, wood, etc., the laser pattern after modulated may be different. Therefore, the material information of the target object may also be reflected in the depth image to be verified. Only when the material is human skin, the depth image to be verified can match the depth template to pass the verification.

Figure 5:
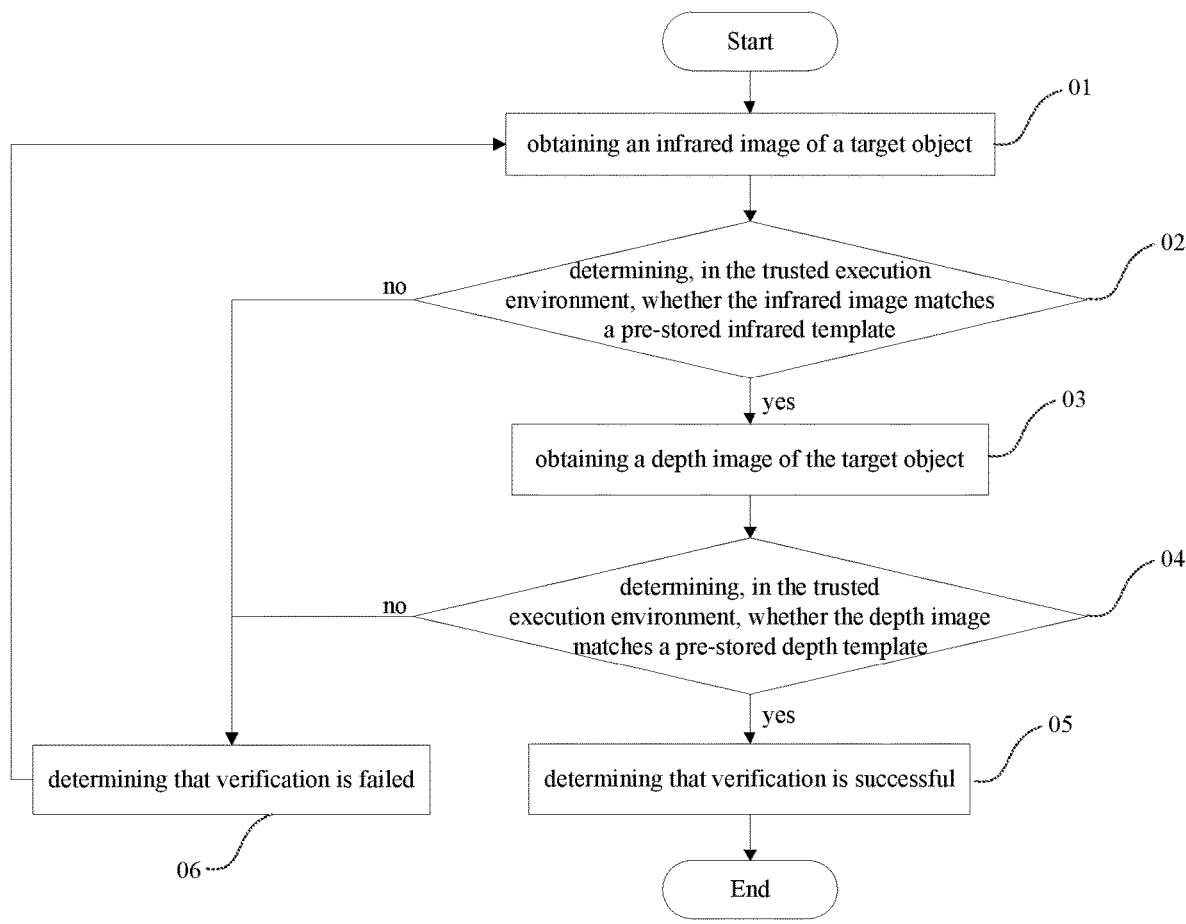
FIG. 5 is a flow chart of a verification method according to an embodiment of the present disclosure.

As illustrated in FIG. 5, in some embodiments, the verification method further includes an action at block 06. At block 06, in response to determining in the trusted execution environment 32 that the infrared image to be verified does not match the pre-stored infrared template, it is determined that the verification is failed, or in response to determining in the trusted execution environment 32 that the depth image to be verified does not match the pre-stored depth template, it is determined that the verification is failed.

In some embodiments, the application processor 312 may be configured to implement the action at block 06. That is, the application processor may be configured to determine that the verification is failed when determining in the trusted execution environment 32 that the infrared image to be verified does not match the pre-stored infrared template or determine that the verification is failed when determining in the trusted execution environment 32 that the depth image to be verified does not match the pre-stored depth template.

In detail, when the infrared image to be verified does not match the infrared template, the application processor 312 determines that the verification is failed, then the actions at blocks 03, 04 and 05 may not be necessary to be implemented. When the infrared image to be verified matches the infrared template and when the depth image to be verified does not match the depth template, the application processor 312 also determines that the verification is failed. After the application processor 312 determines that the verification is failed, the application processor 312 may control a display screen of the electronic device 100 to display words "verification is failed, please input again" or control the electronic device 100 to generate a predetermined vibration to prompt the user that the verification is failed.

Figure 6:
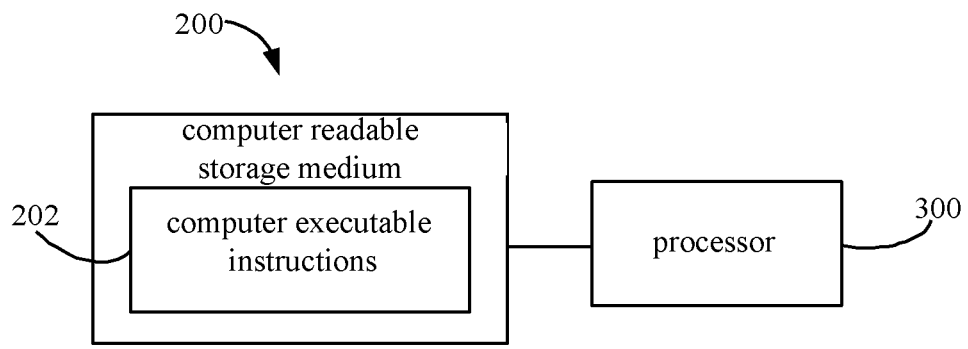
FIG. 6 is a block diagram illustrating a computer readable storage medium and a processor according to an embodiment of the present disclosure.

As illustrated in FIG. 6, the embodiments of the present disclosure further provide a non-transitory computer readable storage medium 200. The non-transitory computer readable storage medium 200 includes one or more computer executable instructions 202 that, when executed by one or more processors 300, cause the processors 300 to perform the verification method according to any one of the above embodiments. For example, the following actions may be implemented. At block 01, an infrared image to be verified of a target object is obtained. At block 02, it is determined, in the trusted execution environment 32, whether the infrared image to be verified matches a pre-stored infrared template. At block 03, in response to determining that the infrared image to be verified matches the pre-stored infrared template, a depth image to be verified of the target object is obtained. At block 04, it is determined, in the trusted execution environment 32, whether the depth image to be verified matches a pre-stored depth template. At block 05, in response to determining that the depth image to be verified matches the pre-stored depth template, it is determined that the verification is successful.

Figure 7:
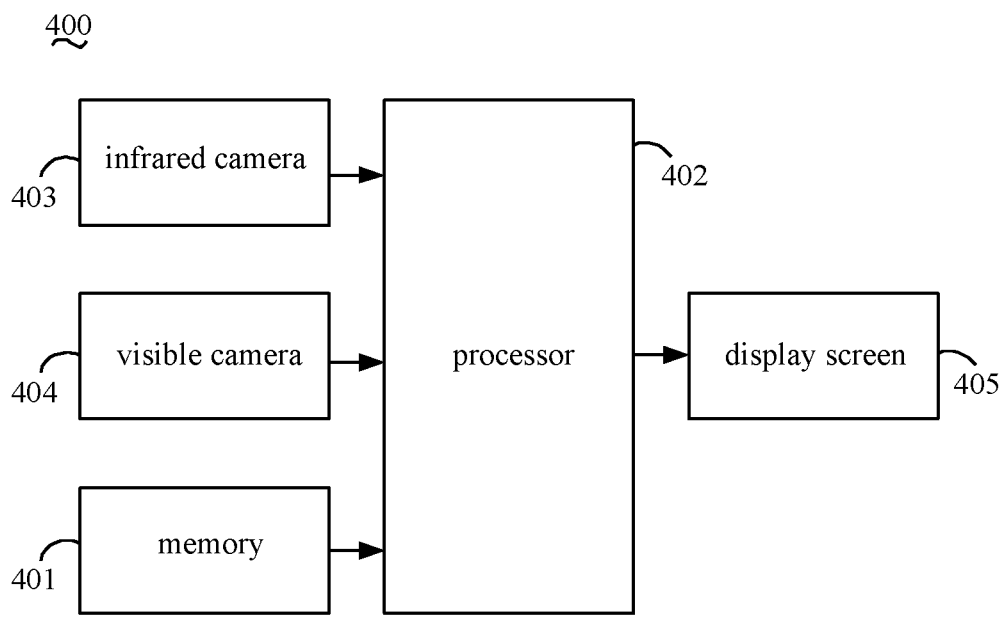
FIG. 7 is a block diagram illustrating a computer device according to an embodiment of the present disclosure.

As illustrated in FIG. 7, the embodiments of the present disclosure further provide a computer device 400. The computer device 400 may include a memory 401 and a processor 402. The memory 401 is stored thereon with computer readable instructions that, when executed by the processor 402, cause the processor 402 to implement the verification method according to any one of the above embodiments. For example, the following actions may be implemented. At block 02, it is determined, in the trusted execution environment 32, whether the infrared image to be verified matches a pre-stored infrared template. At block 03, in response to determining that the infrared image to be verified matches the pre-stored infrared template, a depth image to be verified of the target object is obtained. At block 04, it is determined, in the trusted execution environment 32, whether the depth image to be verified matches a pre-stored depth template. At block 05, in response to determining that the depth image to be verified matches the pre-stored depth template, it is determined that the verification is successful. In addition, the computer device 400 may further include electronic components such as an infrared camera 403, a visible camera 404, a display screen 405, and the like. The infrared camera 403 may be configured to collect the infrared image to be verified of the target object or the laser pattern after modulated by the target object. The visible camera 404 may be configured to collect a color image of the target object. The display screen 405 may be configured to display the infrared image to be verified, the color image, the laser pattern, etc., obtained by the processor.

Second Portion of Embodiments

Figure 8:
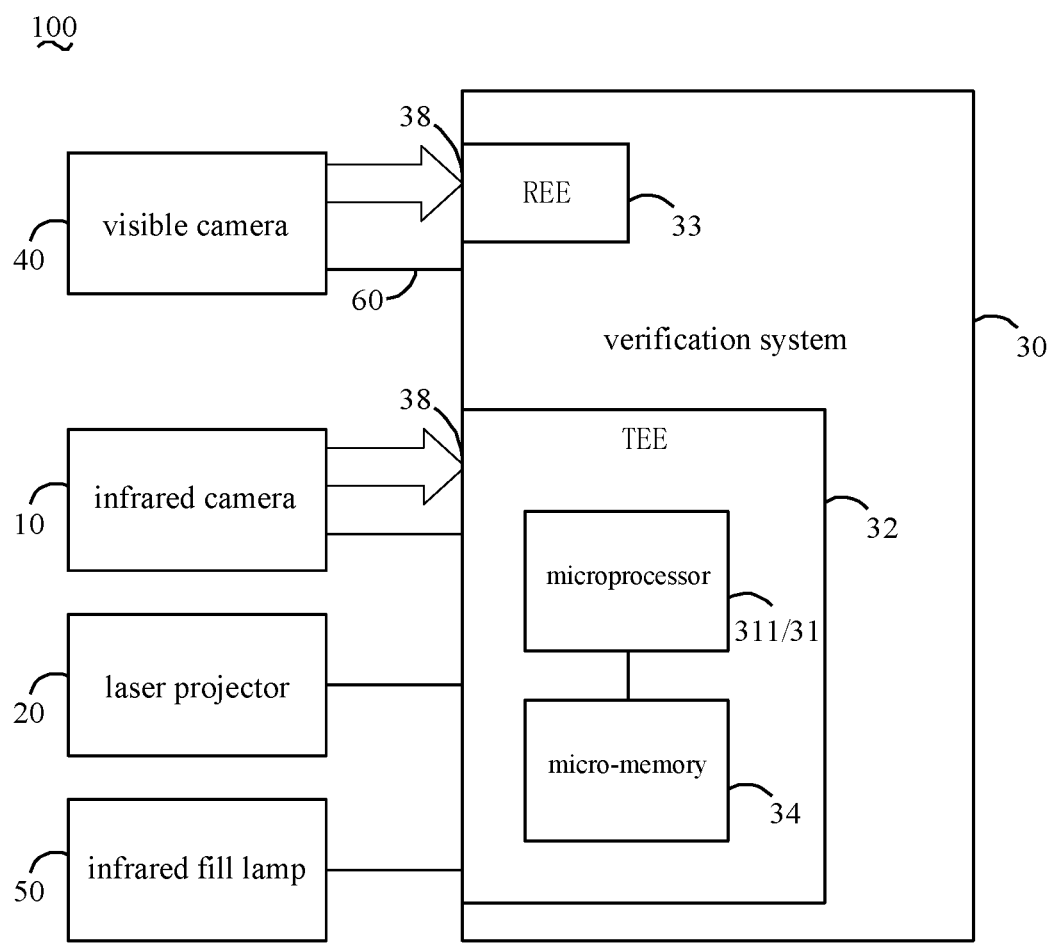
FIG. 8 to FIG. 10 are block diagrams illustrating an electronic device according to an embodiment of the present disclosure.

As illustrated in FIG. 1 and FIG. 8, the electronic device 100 according to the embodiments of the present disclosure include a laser projector 20, an infrared camera 10, and a verification system 30. The electronic device 100 may be a mobile phone, a tablet computer, a smart watch, a smart bracelet, a smart wearable device, and the like. In the embodiments of the present disclosure, for example, the electronic device 100 is the mobile phone. It can be understood that, a specific form of the electronic device 100 is not limited to be the mobile phone.

The laser projector 20 may project laser light to the target object. The laser light projected by the laser projector 20 may be a pattern with a specific speckle or streak. The infrared camera 10 may collect the infrared image of the target object or receive a laser pattern after modulated by the target object. In an embodiment of the present disclosure, the electronic device 100 may further include an infrared fill lamp 50. The infrared fill lamp 50 may be configured to emit infrared light. After the infrared light is reflected by the user, the infrared camera 10 receives the reflected infrared light, such that the infrared camera 10 may collect a clearer infrared image.

The verification system 30 may be an application processor (AP) of the electronic device 100. The verification system 30 is formed with a trusted execution environment 32 and a rich execution environment 33. Codes and a memory area in the trusted execution environment 32 are controlled by an access control unit and are inaccessible to a program in the rich execution environment 33.

When the user uses the electronic device 100, some functions of the electronic device 100 requires verifying the identity of the user. After the verification is passed, the user can obtain an authority to use these functions. For example, the user needs to verify before unlocking the screen, a verification is required before completing the payment, and a verification is required before viewing a short message. In an embodiment of the present disclosure, the verification system 30 may verify whether a facial infrared image of a current user matches an infrared template. After the verification of the infrared template is passed, it further verifies whether a facial depth image of the current user matches a depth template. After the verification of the depth template is passed, relevant authorities are authorized to the user. The infrared template and the depth template may be input into the electronic device 100 by the user before verification. The infrared template may be a facial infrared image of an authorized user. The facial infrared image may be a flat image. The depth template may be a facial depth image of the authorized user.

The verification system 30 may include a processor set 31, and the processor set 31 may include a microprocessor 311. The verification system 30 may further include a micro-memory 34. Both the microprocessor 311 and the micro-memory 34 are configured to execute in the trusted execution environment 32. In other words, the microprocessor 311 is a processing space created in the trusted execution environment 32, and the micro-memory 34 is a memory space created in the trusted execution environment 32. The micro-memory 34 may have the infrared template and the depth template stored thereon. The microprocessor 311 may read the infrared template and the depth template stored in the micro-memory 34 for comparison. The microprocessor 311 may be configured to: obtain an infrared image to be verified of the target object; determine whether the infrared image to be verified matches the infrared template; in response to determining that the infrared image to be verified matches the infrared template, obtain a depth image to be verified of the target object; determine whether the depth image to be verified matches the depth template; and in response to determining that the depth image to be verified matches the depth template, determine that the verification is successful.

In detail, the infrared image to be verified may be a facial infrared image of a current user, and the infrared image to be verified may be collected by the infrared camera 10. During collecting, the microprocessor 311 may control the infrared fill lamp 50 to emit infrared light to supplement amount of the infrared light in the environment. The collected infrared image to be verified is transferred to the microprocessor 311 via a mobile industry processor interface 38, such that the microprocessor 311 obtains the infrared image to be verified. The microprocessor 311 compares the infrared image to be verified with the infrared template to determine whether the infrared image to be verified matches the infrared template. Then the microprocessor 311 outputs a comparison result. The microprocessor 311 executes in the trusted execution environment 32, therefore, none of the infrared image to be verified and the infrared template may be obtained, tampered or stolen by other programs during the comparison, improving information security of the electronic device 100.

After the microprocessor 311 determines that the infrared image to be verified matches the infrared template, it can be considered that the flat image currently input by the user and the flat image input at the time of entry are from a same user. However, since both the infrared template and the infrared image to be verified are flat images, the infrared image to be verified is easy to be forged. For example, a 2D photo may be used for verification. Therefore, by further determining whether the depth image to be verified of the target object matches the depth template, it is possible to better verify whether the current user is the user when the depth template is entered.

The microprocessor 311 obtains the depth image to be verified of the target object and compares the depth image to be verified of the target object with the depth template to determine whether the depth image to be verified of the target object matches the depth template, then outputs the comparison result. The depth image to be verified may be a facial depth image of the current user. The microprocessor 311 executes in the trusted execution environment 32, therefore, none of the depth image to be verified and the depth template may be obtained, tampered or stolen by other programs during the comparison, improving information security of the electronic device 100.

As illustrated in FIG. 1 and FIG. 8, in an embodiment, the microprocessor 311 may obtain the depth image to be verified of the target object through a following way. The microprocessor 311 controls the laser projector 20 to project laser light to the target object, obtains a laser pattern after modulated by the target object, and processes the laser pattern to obtain the depth image to be verified. In detail, the microprocessor 311 is coupled to the laser projector 20, and the microprocessor 311 is coupled to the infrared camera 10. Two ports of the processor set 31 are respectively coupled to the infrared camera 10 and the laser projector 20. The microprocessor 311 controls the laser projector 20 to project the laser light to the target object and controls the infrared camera 10 to collect the laser pattern after modulated by the target object. The microprocessor 311 then obtains the laser pattern sent from the infrared camera 10 via the mobile industry processor interface 38. Calibration information of the laser light projected by the laser projector 20 may be stored in the microprocessor 311. The microprocessor 311 obtains the depth information at different positions of the target object by processing the laser pattern and the calibration information, and the depth image to be verified is formed. Certainly, a specific manner for obtaining the depth image to be verified is not limited to the manner based on a structured light principle in this embodiment. In other embodiments, the depth image to be verified may be obtained based on a time-of-flight principle or a binocular stereo vision principle.

The laser light projected by the laser projector 20 may be infrared light. The laser patterns after modulated by different materials are different when the laser light is projected onto different materials. For example, when the laser light is projected onto materials such as human skin, rubber, wood, etc., the laser pattern after modulated may be different. Therefore, the material information of the target object may also be reflected in the depth image to be verified. Only when the material is human skin, the depth image to be verified can match the depth template to pass the verification.

When the microprocessor 311 determines that the depth image to be verified matches the depth template, the verification is successful. After it is determined that the verification is successful, the current user may obtain relevant operation authorities at the electronic device 100.

In conclusion, both the microprocessor 311 and the micro-memory 34 execute in the trusted execution environment 32, it is determined whether the infrared image to be verified matches the infrared template, and it is determined whether the depth image to be verified matches the depth template. During the process of comparing whether the match is reached, the infrared image to be verified, the infrared template, the depth image to be verified, and the depth template are difficult to be tampered or stolen, thus the information security of the electronic device 100 is relatively high.

As illustrated in FIG. 1 and FIG. 8, in some embodiments, the microprocessor 311 is further to determine that the verification is failed in response to determining that the infrared image to be verified does not match the infrared template. In addition, the microprocessor 311 is further to determine that the verification is failed in response to determining that the depth image to be verified does not match the depth template.

In detail, when the infrared image to be verified does not match the infrared template, the microprocessor 311 determines that the verification is failed, and the current user may not obtain the relevant authorities, thus the depth image to be verified is not necessary to be obtained and the comparison is not necessary to be performed. When the infrared image to be verified matches the infrared template and when the depth image to be verified does not matches the depth template, the microprocessor 311 also determines that the verification is failed, and the current user may not obtain the relevant authorities. After the microprocessor 311 determines that the verification is failed, the verification system may control a display screen 70 of the electronic device 100 to display words "verification is failed, please input again" or control the electronic device 100 to generate a predetermined vibration to prompt the user that the verification is failed.

In the following, a manner for generating the infrared template and the depth template will be described in detail with reference to above contents. It should be understood that, the infrared template and the depth template may be generated before the user performs above verification.

In some embodiments, the microprocessor 311 may be further configured to obtain a template infrared image of the target object and store the template infrared image of the target object into the micro-memory 34 as the infrared template; the microprocessor 311 may also be configured to obtain a template depth image of the target object and store the template depth image of the target object into the micro-memory 34 as the depth template.

In detail, after the user inputs an instruction of generating the infrared template in the electronic device 100, the microprocessor 311 controls the infrared camera 10 to collect the template infrared image of the user. The template infrared image may be a facial infrared image of the user. The infrared camera 10 transfers the collected template infrared image to the microprocessor 311 via the mobile industry processor interface 38. Thus, the microprocessor 311 obtains the template infrared image and stores the template infrared image into the micro-memory 34 as the infrared template.

After the user inputs an instruction of generating the depth template in the electronic device 100, and after the microprocessor 311 controls the laser projector 20 to project laser light to the target object, the microprocessor 311 may further controls the infrared camera 10 to collect the laser pattern after modulated by the target object. Then the microprocessor 311 obtains the laser pattern from the infrared camera 10 via the mobile industry processor interface 38. The microprocessor 311 processes the laser pattern to obtain a depth image. In detail, the microprocessor 311 is stored thereon with calibration information of the laser light projected by the laser projector 20. The microprocessor 311 obtains depth information at different positions of the target object by processing the laser pattern and the calibration information, and the template depth image is formed. The template depth image may be a facial depth image of the user. Thus the microprocessor 311 obtains the template depth image and stores the template depth image into the micro-memory 34 as the depth template.

In some embodiments, when obtaining the template depth image of the target object, the microprocessor 311 obtains a plurality of laser pattern frames after modulated by the target object, processes the plurality of laser pattern frames to obtain a plurality of initial depth image frames, and combines the plurality of initial depth image frames to obtain the template depth image.

In detail, the template depth image regarded as the depth template may be obtained by combining a plurality of initial depth images of user's face obtained at a plurality of different angles. The plurality of initial depth images may be obtained by processing the plurality of laser pattern frames, and the plurality of laser pattern frames may be obtained when the head of user swings to different angles. For example, the head of the user may perform swing action such as left swing, right swing, up swing, and down swing respectively under guidance of display content of a display screen 70. During the swing process, the laser projector 20 may project the laser light to the user's face continuously. The infrared camera 10 collects the plurality of laser pattern frames after modulated. The microprocessor 311 obtains the plurality of laser pattern frames and processes the plurality of laser pattern frames to obtain the plurality of initial depth image frames. The microprocessor 311 combines the plurality of initial depth image frames to obtain the template depth image. The template depth image includes depth information at different angles such as front, left, right, and lower sides of the user's face. Thus, when the user is required to be verified, the user's facial depth image at different angles may be obtained and compared with the depth template, instead of requiring the user to align the infrared camera 10 strictly according to a certain angle, shortening verification time of the user.

As illustrated in FIG. 1 and FIG. 8, in some embodiments, the verification system 30 may be further configured to obtain a color image of the target object, store the color image into the rich execution environment 33, obtain the color image from the rich execution environment 33, and control the display screen 70 to display the color image.

In detail, the electronic device 100 may further include a visible camera 40. The visible camera 40 is coupled to the verification system 30. In detail, the visible camera 40 may be coupled to the verification system 30 via an inter-integrated circuit bus 60 or the mobile industry processor interface 38. The verification system 30 may be configured to enable the visible camera 40, to power down the visible camera 40 or to reset the visible camera 40. The visible camera 40 may be configured to collect the color image. The verification system 30 may obtain the color image from the visible camera 40 via the mobile industry processor interface 38 store the color image into the rich execution environment 33. Data stored in the rich execution environment 33 may be acquired by other programs. In an embodiment of the present disclosure, the color image may be obtained and displayed by the display screen 70 of the electronic device 100. The visible camera 40 and the infrared camera 10 may work simultaneously. Obtaining the color image by the verification system 30 and obtaining the template infrared image or the template depth image by the microprocessor 311 may be implemented simultaneously. The user may adjust orientation of the head by observing the color image displayed in the display screen 70 to facilitate the infrared camera 10 to obtain a more accurate infrared image or laser pattern.

Third Portion of Embodiments

Figure 9:
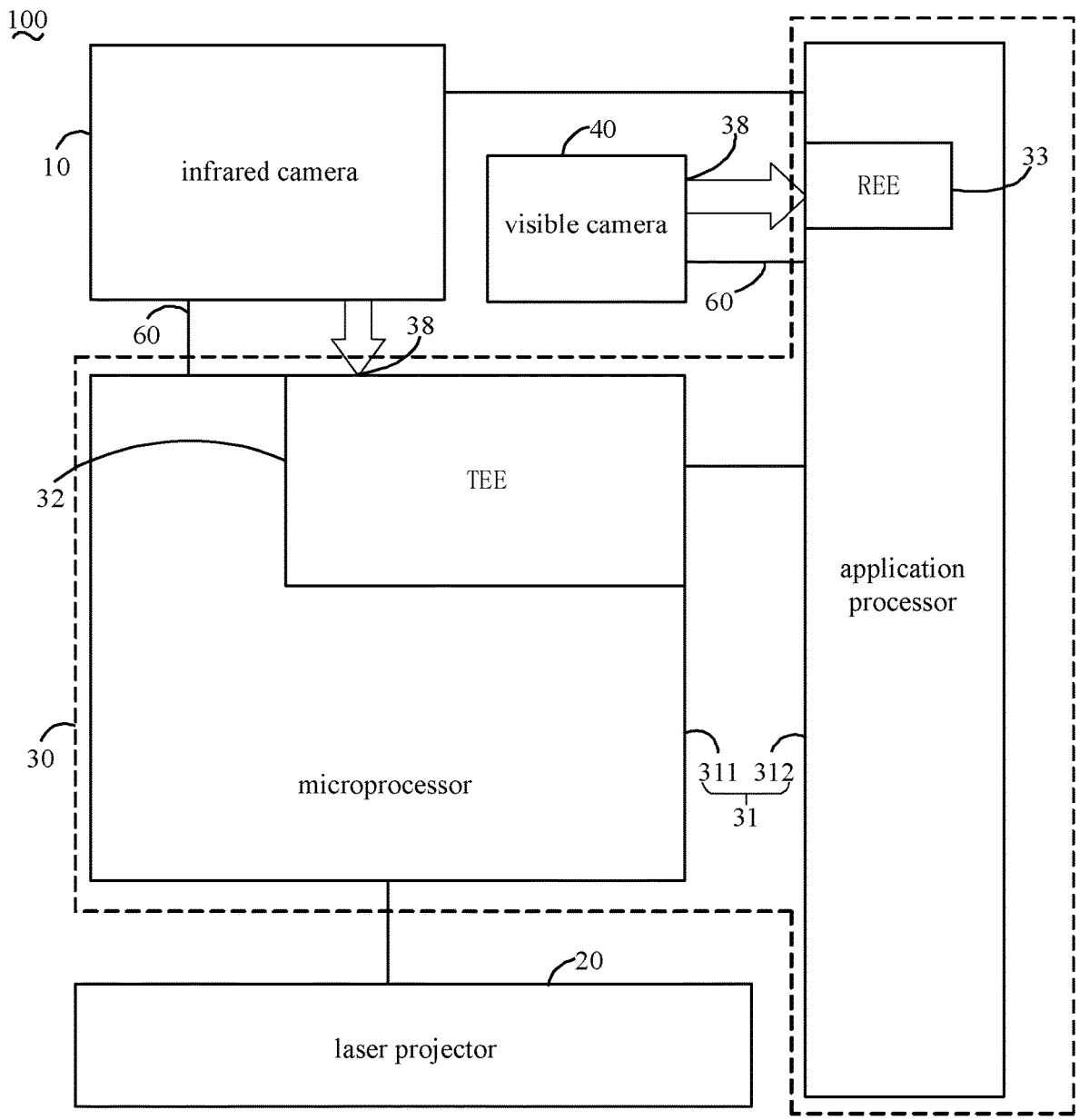

As illustrated in FIG. 1 and FIG. 9, the electronic device 100 according to an embodiment of the present disclosure includes a laser projector 20, an infrared camera 10, and a verification system 30. The electronic device 100 may be a mobile phone, a tablet computer, a smart watch, a smart bracelet, a smart wearable device, and the like. In an embodiment of the present disclosure, for example, the electronic device 100 is the mobile phone. It can be understood that, a specific form of the electronic device 100 is not limited to be the mobile phone.

The laser projector 20 may project laser light to the target object. The laser light projected by the laser projector 20 may be a pattern with a specific speckle or streak. The infrared camera 10 may collect the infrared image of the target object or receive a laser pattern after modulated by the target object.

The processor set 31 includes a microprocessor 311 and an application processor (AP) 312. The microprocessor 311 and the application processor 312 are coupled to each other.

The microprocessor 311 may be a separate chip or be integrated together with the application processor 312. The microprocessor 311 is formed with a trusted execution environment 32. Codes and a memory area in the trusted execution environment 32 are controlled by an access control unit and are inaccessible to a program in the rich execution environment 33. The rich execution environment 33 may be formed in the microprocessor 311 or formed in the application processor 312. A storage space and a processing space may be allocated in the trusted execution environment 32 of the microprocessor 311, and data stored in the memory space may be extracted by the processing space for processing, analysis, and the like. The microprocessor 311 is coupled to the infrared camera 10, the microprocessor 311, and the laser projector 20.

The application processor 312 may work as a system of the electronic device 100. The application processor 312 may be coupled to a plurality of components of the electronic device 100 and control the plurality of components to obtain or send a light signal, a sound signal, and the like. For example, the plurality of components may include a display screen 70, the visible camera 40, the infrared camera 10, a receiver, a loudspeaker, and the like.

When the user uses the electronic device 100, some functions of the electronic device 100 requires verifying identity of the user. After the verification is passed, the user can obtain an authority to use these functions. For example, the user needs to verify before unlocking the screen, a verification is required before completing the payment, and a verification is required before viewing a short message. It can be understood that, levels of authorities to use different functions may be different. For example, viewing a message requires passing a first level verification, while completing the payment requires passing both the first level verification and a second level verification.

In an embodiment of the present disclosure, the verification system 30 may be configured to verify whether a facial infrared image of the current user matches the infrared template. When the facial infrared image of the current user matches the infrared template, the verification about the infrared template is successful. After the verification about the infrared template is successful, the verification system may further verify whether a facial depth image of the current user matches the depth template. When the facial depth image of the current user matches the depth template, the verification about the depth template is successful. The infrared template and the depth template may be input to the electronic device 100 by the user and stored in the trusted execution environment 32 before the verification. In detail, the infrared template and the depth template may be stored in the memory space of the trusted execution environment 32. The infrared template may be facial infrared image of an authorized user, and the facial infrared image may be a flat image. The depth template may be a facial depth image of the authorized user.

As illustrated in FIG. 1 and FIG. 9, when the verification system 30 requires verification, the microprocessor 311 obtains an infrared image to be verified of the target object first. Then the microprocessor 311 determines in the trusted execution environment 32 whether the infrared image to be verified matches the infrared template to generate a first determination result. The microprocessor 311 sends the first determination result to the application processor 312. When the first determination result is that the infrared image to be verified matches the infrared template, the microprocessor 311 obtains depth image to be verified of the target object. Then the microprocessor 311 determines in the trusted execution environment 32 whether the depth image to be verified matches the depth template to generate a second determination result. The microprocessor 311 sends the second determination result to the application processor 312.

In detail, the infrared image to be verified may be a facial infrared image of a current user, and the infrared image to be verified may be collected by the infrared camera 10. During collecting the infrared image to be verified, the microprocessor 311 may control an infrared fill lamp 50 to emit infrared light to supplement amount of the infrared light in the environment. The collected infrared image to be verified is transferred to the trusted execution environment 32 of the microprocessor 311 via a mobile industry processor interface 38, such that the microprocessor 311 obtains the infrared image to be verified. The microprocessor 311 compares, in the trusted execution environment 32, the infrared image to be verified with the infrared template to determine whether the infrared image to be verified matches the infrared template. Then the microprocessor 311 outputs the first determination result. The microprocessor 311 determines in the trusted execution environment 32 whether the infrared image to be verified matches the infrared template, therefore, none of the infrared image to be verified and the infrared template may be obtained, tampered or stolen by other programs during the comparison, improving information security of the electronic device 100.

The microprocessor 311 may further send the first determination result to the application processor 312. After the application processor 312 receives the first determination result, the application processor 312 may control the above-mentioned plurality of components to perform corresponding operations based on the first determination result.

After the microprocessor 311 determines that the infrared image to be verified matches the infrared template, i.e., the first determination result is yes, it can be considered that the flat image currently input by the user and the flat image input at the time of entry are from a same user. However, since both the infrared template and the infrared image to be verified are flat images, the infrared image to be verified is easy to be forged. For example, a 2D photo may be used for verification. Therefore, by further determining whether the depth image to be verified of the target object matches the depth template, it is possible to better verify whether the current user is the user when the depth template is entered. At this time, the microprocessor 311 obtains the depth image to be verified of the target object, compares, in the trusted execution environment 32, the depth image to be verified with the depth template to determine whether the depth image to be verified matches the depth template, and then outputs the second determination result. The depth image to be verified may be a facial depth image of the current user. The microprocessor 311 determines in the trusted execution environment 32 whether the depth image to be verified matches the depth template, therefore, the depth image to be verified and the depth template may be difficult to be obtained, tampered, or stolen by other programs during the comparison, improving information security of the electronic device 100.

The microprocessor 311 further sends the second determination result to the application processor 312. After receiving the second determination result, the application processor 312 may control the above-mentioned plurality of components to perform corresponding operations based on the second determination result.

As illustrated in FIG. 1 and FIG. 9, in an embodiment, the microprocessor 311 may obtain the depth image to be verified of the target object through a following way. The microprocessor 311 controls the laser projector 20 to project laser light to the target object, obtains a laser pattern after modulated by the target object, and processes the laser pattern to obtain the depth image to be verified. In detail, the microprocessor 311 is coupled to the laser projector 20, and the microprocessor 311 is coupled to the infrared camera 10. The microprocessor 311 controls the laser projector 20 to project the laser light to the target object and controls the infrared camera 10 to collect the laser pattern after modulated by the target object. The microprocessor 311 then obtains the laser pattern sent from the infrared camera 10 via the mobile industry processor interface 38. Calibration information of the laser light projected by the laser projector 20 may be stored in the microprocessor 311. The microprocessor 311 obtains depth information at different positions of the target object by processing the laser pattern and the calibration information, and the depth image to be verified is formed.

Certainly, a specific manner for obtaining the depth image to be verified is not limited to the manner based on a structured light principle in this embodiment. In other embodiments, the depth image to be verified may be obtained based on a time-of-flight (TOF) principle or a binocular stereo vision principle. In other words, a specific form of the depth image to be verified may include at least one of a structured light depth image, a time-of-flight depth image, and a binocular stereo vision depth image. In an example, the depth image to be verified may include multiples of the structured light depth image, the time-of-flight depth image, and the binocular stereo vision depth image.

The laser light projected by the laser projector 20 may be infrared light. The laser patterns after modulated by different materials are different when the laser light is projected onto different materials. For example, when the laser light is projected onto materials such as human skin, rubber, wood, etc., the laser pattern after modulated may be different. Therefore, the material information of the target object may also be reflected in the depth image to be verified. Only when the material is human skin, the depth image to be verified can match the depth template to pass the verification.

In conclusion, in the electronic device 100 according to an embodiment of the present disclosure, the microprocessor 311 may determine in the trusted execution environment 32 whether the infrared image to be verified matches the infrared template and determine in the trusted execution environment 32 whether the depth image to be verified matches the depth template. During the process of determining whether match is reached, the infrared image to be verified, the infrared template, the depth image to be verified, and the depth template are difficult to be tampered or stolen, and the information security of the electronic device 100 is relatively high.

As illustrated in FIG. 1 and FIG. 9, in some embodiments, the application processor 312 is further to control an external device to prompt that the verification is failed in response to receiving the first determination result as no. In detail, the microprocessor 311 sends the first determination result to the application processor 312. The application processor 312 receives the first determination result. When the first determination result is no, it indicates that the infrared image to be verified does not match the infrared template, and the current user is not the authorized user. At this time, the application processor 312 may control the external device to prompt that the verification is failed. The external device may be one or more of the above-mentioned plurality of components. For example, the application processor 312 may control the display screen 70 of the electronic device 100 to display words "verification is failed, please input again" or control the electronic device 100 to generate a predetermined vibration, a preset voice prompt, and the like.

In some embodiments, the application processor 312 is further to the external device to prompt that the verification is failed in response to receiving the second determination result as no. In detail, the microprocessor 311 sends the second determination result to the application processor 312. The application processor 312 receives the second determination result. When the second determination result is no, it indicates that the depth image to be verified does not match the depth template, and the current user is not the authorized user. At this time, the application processor 312 may control the external device to prompt that the verification is failed. The external device may be one or more of the above-mentioned plurality of components. For example, the application processor 312 may control the display screen 70 of the electronic device 100 to display words "verification is failed, please input again" or control the electronic device 100 to generate a predetermined vibration, a preset voice prompt, and the like.

As illustrated in FIG. 9, in some embodiments, the application processor 312 may further configured to authorize the current user with a first preset authority in response to receiving the first determination result as yes. It can be understood that, when the first determination result is yes, it may be determined that the current user is the authorized user to some extent. At this time, the current user may be authorized a certain authority, i.e., the first preset authority, according to user's preset settings. For example, the first preset authority may be authorities such as viewing a total number of messages, opening a certain application, viewing a preset number of photos, and the like. Certainly, the first preset authority may be personalized in the electronic device 100 by the user. In this way, for a scene in which the first preset authority alone may satisfy the user's use requirement, the user can start using the related function without waiting for the application processor 312 to receive the second determination result.

In some embodiments, the application processor 312 may further configured to authorize the current user with a second preset authority in response to receiving the second determination result as yes. In detail, when the second determination result is yes, it may be determined that the current user is the authorized user, and reliability of the determination result is high. At this time, the current user may be authorized a certain authority, i.e., the second preset authority, according to user's preset settings. The second preset authority may be different from the first preset authority. For example, the second preset authority may be authorities such as viewing detailed content of a message, completing payment, unlocking the screen, and the like. Certainly, the second preset authority may be personalized in the electronic device 100 by the user.

In the following, a manner for generating the infrared template and the depth template will be described in detail with reference to above contents. It should be understood that, the infrared template and the depth template may be generated before the user performs above verification.

As illustrated in FIG. 1 and FIG. 9, in some embodiments, the microprocessor 311 may be further configured to obtain a template infrared image of the target object and store the template infrared image of the target object into the trusted execution environment 32 as the infrared template; to obtain a template depth image of the target object and store the template depth image of the target object into the trusted execution environment 32 as the depth template.

In detail, after the user inputs an instruction of generating the infrared template in the electronic device 100, the application processor 312 may receive the instruction of generating the infrared template and send the instruction of generating the infrared template to the microprocessor 311. The microprocessor 311 controls the infrared camera 10 to collect the template infrared image of the user according to the instruction. The template infrared image may be a facial infrared image of the user. The infrared camera 10 transfers the collected template infrared image to the trusted execution environment 32 of the microprocessor 311 via the mobile industry processor interface 38. Thus, the microprocessor 311 obtains the template infrared image and stores the template infrared image into the trusted execution environment 32 as the infrared template.

After the user input an instruction of generating the depth template in the electronic device 100, the application processor 312 may receive the instruction of generating the depth template and send the instruction of generating the depth template to the microprocessor 311. The microprocessor 311 controls the laser projector 20 to project laser light to the target object according to the instruction, the microprocessor 311 may further controls the infrared camera 10 to collect the laser pattern after modulated by the target object. Then the microprocessor 311 obtains the laser pattern from the infrared camera 10 via the mobile industry processor interface 38. The microprocessor 311 processes the laser pattern to obtain a depth image. In detail, the microprocessor 311 is stored thereon with calibration information of the laser light projected by the laser projector 20. The microprocessor 311 obtains depth information at different positions of the target object by processing the laser pattern and the calibration information, and the template depth image is formed. The template depth image may be a facial depth image of the user. Thus the microprocessor 311 obtains the template depth image and stores the template depth image into the trusted execution environment 32 as the depth template.

In some embodiments, when obtaining the template depth image of the target object, the microprocessor 311 obtains a plurality of laser pattern frames after modulated by the target object, processes the plurality of laser pattern frames to obtain a plurality of initial depth image frames, and combines the plurality of initial depth image frames to obtain the template depth image.

In detail, the template depth image regarded as the depth template may be obtained by combining a plurality of initial depth images of user's face obtained at a plurality of different angles. The plurality of initial depth images may be obtained by processing the plurality of laser pattern frames, and the plurality of laser pattern frames may be obtained when the head of user swings to different angles. For example, the head of the user may perform swing action such as left swing, right swing, up swing, and down swing respectively under guidance of display content of a display screen 70. During the swing process, the laser projector 20 may project the laser light to the user's face continuously. The infrared camera 10 collects the plurality of laser pattern frames after modulated. The microprocessor 311 obtains the plurality of laser pattern frames and processes the plurality of laser pattern frames to obtain the plurality of initial depth image frames. The microprocessor 311 combines the plurality of initial depth image frames to obtain the template depth image. The template depth image includes the depth information at different angles such as front, left, right, and lower sides of the user's face. Thus, when the user is required to be verified, user's facial depth image at different angles may be obtained and be compared with the depth template, instead of requiring the user to align the infrared camera 10 strictly according to a certain angle, shortening verification time of the user.

As illustrated in FIG. 1 and FIG. 9, in some embodiments, the application processor 312 may be further configured to obtain a color image of the target object and store the color image into the rich execution environment 33, obtain the color image from the rich execution environment 33, and control the display screen 70 to display the color image.

In detail, the electronic device 100 may further include a visible camera 40. The visible camera 40 is coupled to the application processor 312. In detail, the visible camera 40 may be coupled to the application processor 312 via an inter-integrated circuit bus 60 or the mobile industry processor interface 38. The application processor 312 may be configured to enable the visible camera 40, to power down the visible camera 40 or to reset the visible camera 40. The visible camera 40 may be configured to collect the color image. The application processor 312 may obtain the color image from the visible camera 40 via the mobile industry processor interface 38 and store the color image into the rich execution environment 33. Data stored in the rich execution environment 33 may be acquired by other programs. In an embodiment of the present disclosure, the color image may be obtained and displayed by the display screen 70 of the electronic device 100. The visible camera 40 and the infrared camera 10 may work simultaneously. Obtaining the color image by the application processor 312 and obtaining the template infrared image or the template depth image by the microprocessor 311 may be implemented simultaneously. The user may adjust orientation of the head by observing the color image displayed in the display screen 70 to facilitate the infrared camera 10 to obtain a more accurate infrared image or laser pattern.

Figure 10:
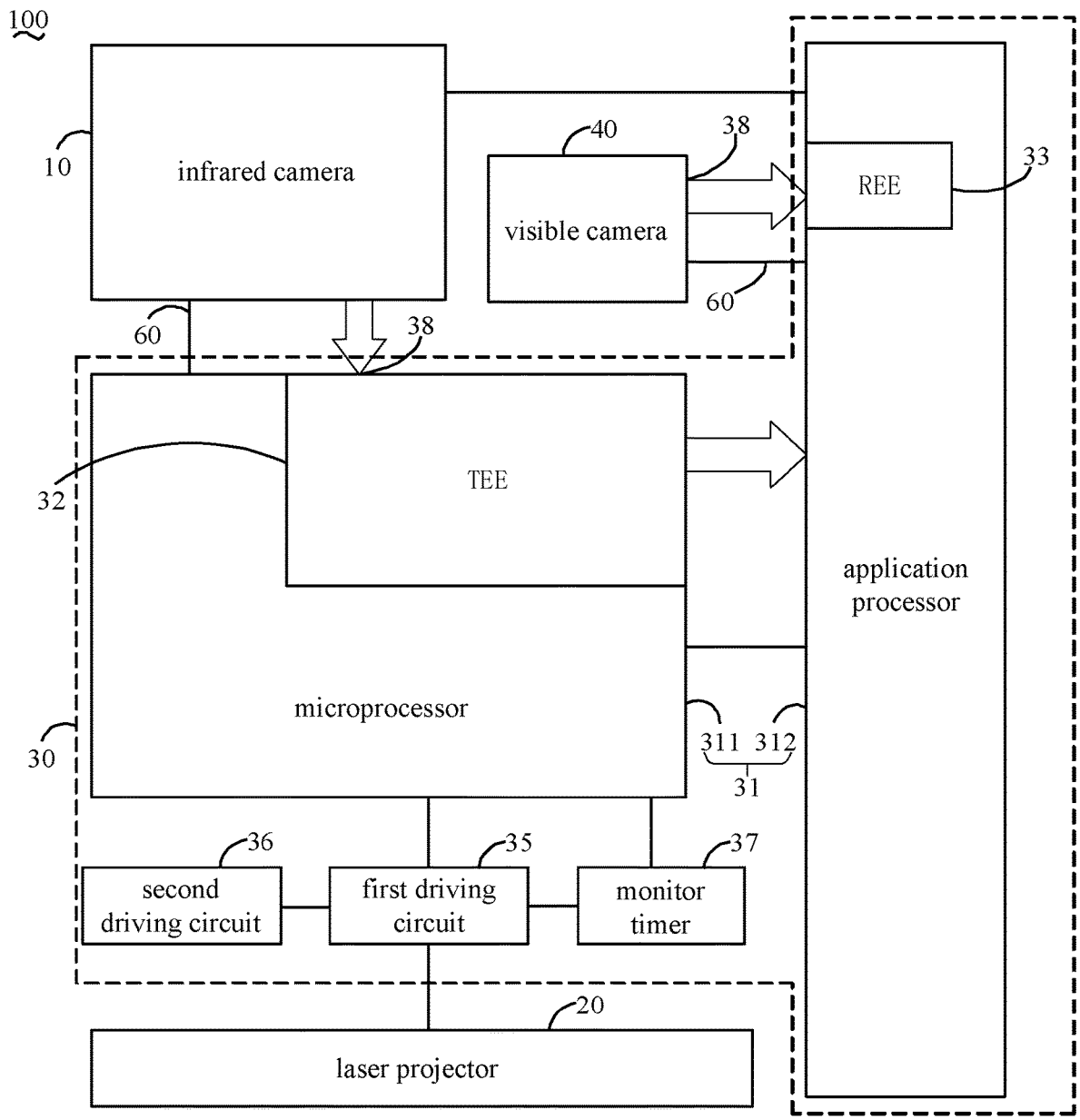

As illustrated in FIG. 10, in some embodiments, the verification system 30 may further include a first driving circuit 35, a second driving circuit 36, and a monitor timer 37.

The first driving circuit 35 is coupled to the microprocessor 311 and the laser projector 20. The microprocessor 311 may be configured to control the first driving circuit 35 to drive the laser projector 20 to project the laser light. In detail, the first driving circuit 35 may serve as a current source of the laser projector 20. When the first driving circuit 35 is switched off, the laser projector 20 cannot emit the laser light outward. The second driving circuit 36 is coupled to the first driving circuit 35. The second driving circuit 36 may be configured to supply power for the first driving circuit 35. For example, the second driving circuit 36 may be a DC/DC circuit. The first driving circuit 35 may be separately packaged into a driving chip, the second driving circuit 36 may be separately packaged into a driving chip, or the first driving circuit 35 and the second driving circuit 36 are collectively packaged in one driving chip. The driving chip may be disposed on a substrate or a circuit board of the laser projector 20.

It can be understood that, when the microprocessor 311 malfunctions, for example, when the microprocessor 311 is down, the first driving circuit 35 may be in a state of continuously driving the laser projector 20 to emit laser light, and the microprocessor 311 cannot effectively and timely control the first driving circuit 35. The continuously emitted laser light has a high risk. Therefore, it is necessary to monitor operating state of the microprocessor 311 and turn off the laser projector 20 in time when the microprocessor 311 malfunctions. In an embodiment of the present disclosure, the laser projector 20 may be turned off by switching off the first driving circuit 35.

In order to monitor the operating state of the microprocessor 311, the microprocessor 311 may transmit a predetermined signal to the monitor timer 37 every predetermined time interval. For example, a reset signal is transmitted to the monitor timer 37 every 50 milliseconds. When malfunctioning, the microprocessor 311 cannot run a program for transmitting the predetermined signal to the monitor timer 37, so that the malfunction state of the microprocessor 311 is detected due to inability to transmit the predetermined signal.

As illustrated in FIG. 10, the monitor timer 37 is coupled to the first driving circuit 35, and the monitor timer 37 is coupled to the microprocessor 311. The monitor timer 37 is configured to switch off the first driving circuit 35 to turn off the laser projector 20 when the monitor timer 37 does not receive the predetermined signal for the predetermined time period. The predetermined time period may be set when the electronic device 100 leaves the factory or be customized on the electronic device 100 by the user.

Therefore, when the monitor timer 37 does not receive the predetermined signal for the predetermined time period, it is determined that the microprocessor 311 malfunctions, and the laser projector 20 may emit the laser light for a long time. At this time, the monitor timer 37 switches off the first driving circuit 35 to turn off the laser projector 20, so as to prevent the laser projector 20 from continuously emitting the laser light outward and hurting the user.

In detail, in an embodiment of the present disclosure, a specific form of the monitor timer 37 may be a counter. After the monitor timer 37 receives the predetermined signal, the monitor timer 37 starts counting down at a certain speed from one number. If the microprocessor 311 operates normally, the microprocessor 311 may transmit the predetermined signal again before the countdown value reaches 0. The monitor timer 37 resets the countdown value after receiving the predetermined signal. If the microprocessor 311 does not operate normally, the monitor timer 37 counts down to 0, then the monitor timer 37 determines that the microprocessor 311 malfunctions. At this time, the monitor timer 37 transmits a signal to switch off the first driving circuit 35 to turn off the laser projector 20.

In an example, the monitor timer 37 may be disposed outside the microprocessor 311. The monitor timer 37 may be an external timer chip. The monitor timer 37 may be coupled to one I/O pin of the microprocessor 311 to receive the predetermined signal transmitted from the microprocessor 311. Operating reliability of the external monitor timer 37 is relatively high. In another example, the monitor timer 37 may be integrated into the microprocessor, and functions of the monitor timer 37 may be implemented by an internal timer of the microprocessor, thus simplifying hardware circuit design of the verification system.

Structure of the laser projector 20 will be described in the following by way of example. It will be understood that the structure of the laser projector 20 described in the following is applicable to the electronic device 100 of the first portion of embodiments, the second portion of embodiments, and the third portion of embodiments.

Figure 11:
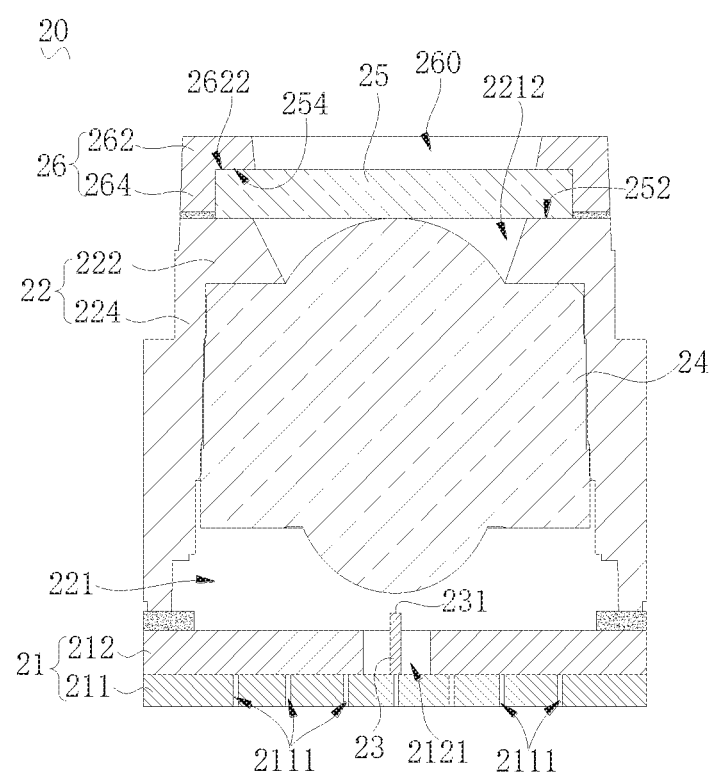
FIG. 11 is a block diagrams illustrating a laser projector according to an embodiment of the present disclosure.

As illustrated in FIG. 11, in some embodiments, the laser projector 20 includes a substrate component 21, a lens cone 22, a light source 23, a collimation element 24, a diffractive optical element (DOE) 25, and a protective cover 26.

The substrate component 21 includes a substrate 211 and a circuit board 212. The circuit board 212 is disposed on the substrate 211. The circuit board 212 is configured to connect the light source 23 to a main board of the electronic device 100. The circuit board 212 may be a hard board, a soft board, or a combination of a soft board and a hard board. In the embodiment illustrated in FIG. 11, a through hole 2121 is defined on the circuit board 212. The light source 23 is fixed on the substrate 211 and is electrically connected to the circuit board 212. A heat dissipation hole 2111 may be defined on the substrate 211. Heat generated by operation of the light source 23 or the circuit board 212 may be dissipated by the heat dissipation hole 2111. The heat dissipation hole 2111 may be filled with thermal conductive adhesive, to further improve heat dissipation performance of the substrate component 21.

The lens cone 22 is fixedly connected to the substrate component 21. A receiving cavity 221 is defined in the lens cone 22. The lens cone 22 includes a top wall 222 and an annular peripheral wall 224 extending from the top wall 222. The peripheral wall 224 is disposed on the substrate component 21. The top wall 222 is provided with a light through hole 2212 communicating with the receiving cavity 221. The peripheral wall 224 may be connected to the circuit board 212 by glue.

The protective cover 26 is disposed on the top wall 222. The protective cover 26 includes a baffle 262 provided with a through hole 260 for light exiting and an annular peripheral wall 264 extending from the baffle 262.

Both the light source 23 and the collimation element 24 are disposed in the receiving cavity 221. The diffractive optical element 25 is disposed on the lens cone 22. The collimation element 24 and the diffractive optical element 25 are disposed on a light path of light emitting of the light source 23 successively. The collimation element 24 is configured to collimate a laser beam emitted by the light source 23. The laser passes through the collimation element 24 and then passes through the diffractive optical element 25, to form the laser pattern.

Figure 12:
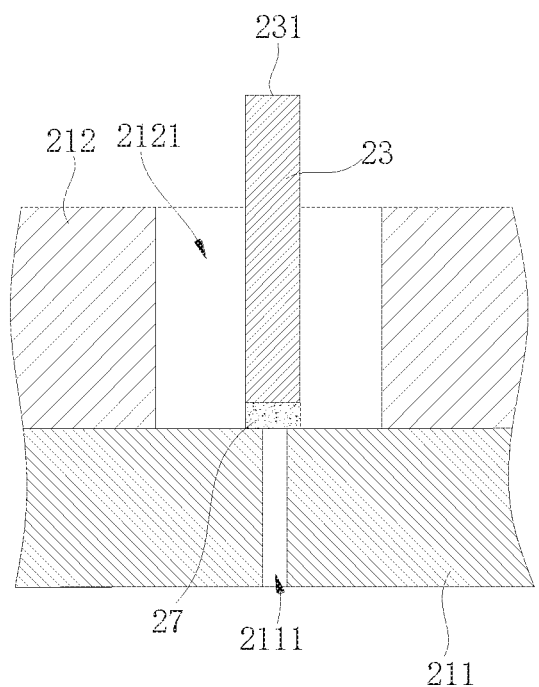
FIG. 12 to FIG. 14 are schematic diagrams illustrating portion structure of a laser projector according to embodiments of the present disclosure.
Figure 13:
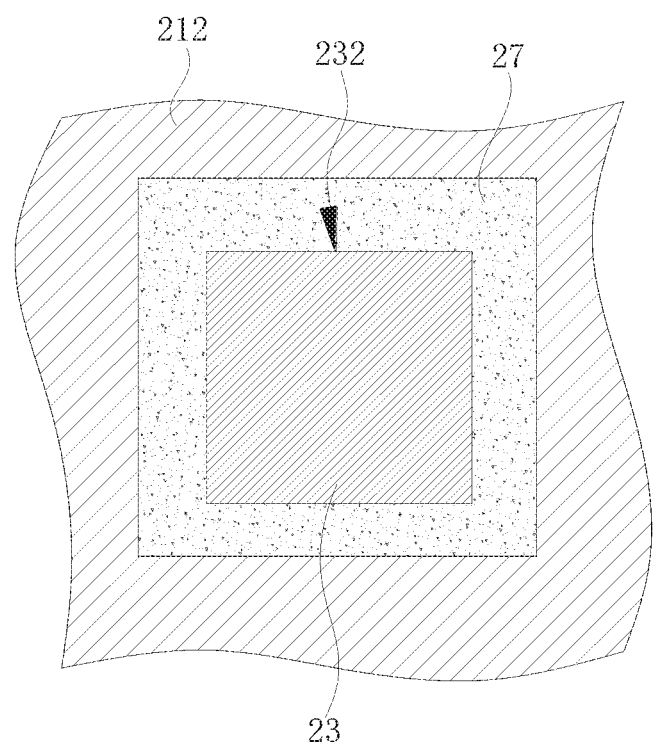

The light source 23 may be a vertical cavity surface emitting laser (VCSEL) or an edge-emitting laser (EEL). In the embodiment illustrated in FIG. 11, the light source 23 is the edge-emitting laser. In detail, the light source 23 may be a distributed feedback laser (DFB). The light source 23 is configured to emit a laser beam into the receiving cavity 221. As illustrate in FIG. 12, the light source 23 is generally columnar. An end surface of the light source 23 away from the substrate component 21 forms a light emitting surface 231. The laser beam is emitted from the light emitting surface 231. The light emitting surface 231 faces the collimation element 24. The light source 23 is fixed on the substrate component 21. In detail, the light source 23 may be bonded to the substrate component 21 by sealant 27. For example, a side of the light source 23 opposite the light emitting surface 231 is bonded to the substrate component 21. As illustrated in FIG. 11 and FIG. 13, side surfaces 232 of the light source 23 may also be bonded to the substrate component 21. The sealant 27 may wrap around the side surfaces 232. Alternatively, only one or some of the side surfaces 232 may be bonded to the substrate component 21. At this time, the sealant 27 may be a thermal conductive adhesive to transfer heat generated by the operation of the light source 23 to the substrate component 21.

As illustrated in FIG. 11, the diffractive optical element 25 is carried by the top wall 222 and housed within the protective cover 26. Two opposite sides of the diffractive optical element 25 are respectively pressed against the protective cover 26 and the top wall 222. The baffle 262 includes a resisting surface 2622 adjacent to the light through hole 2212, and the diffractive optical element 25 is pressed against the resisting surface 2622.

In detail, the diffractive optical element 25 includes a diffractive incident plane 252 and a diffractive emission plane 254 opposite to each other. The diffractive optical element 25 is carried by the top wall 222. The diffractive emission plane 254 is pressed against a surface (i.e. the resisting surface 2622) adjacent to the light through hole 2212 of the baffle 262. The diffractive incident plane 252 is pressed against the top wall 222. The light through hole 2212 is aligned with the receiving cavity 221, and the through hole 260 for light exiting is aligned with the light through hole 2212. The top wall 222, the annular peripheral wall 264, and the baffle 262 are pressed against the diffractive optical element 25, thereby preventing the diffractive optical element 25 from falling out of the protective cover 26 in a light exiting direction. In some embodiments, the protective cover 26 is bonded to the top wall 222 by glue.

The light source 23 of the above laser projector 20 adopts the edge emitting laser. On the one hand, a temperature shift of the edge emitting laser is smaller than that of the VCSEL array. On the other hand, since the edge emitting laser is a single-point light emitting structure, it is not necessary to design an array structure, which is easy to manufacture, and the light source of the laser projector 20 is low in cost.

When the laser of the distributed feedback laser is propagated, gain of power is obtained through feedback of a grating structure. To increase the power of the distributed feedback laser, injection current may be increased and/or length of the distributed feedback laser may be increased. As the injection current increases, power consumption of the distributed feedback laser increases and a problem of serious heating may be generated. Therefore, in order to ensure that the distributed feedback laser can work normally, the length of the distributed feedback laser may be increased, resulting in a distributed feedback laser generally having a slender structure. When the light emitting surface 231 of the edge emitting laser faces the collimation element 24, the edge emitting laser is placed vertically. Since the edge emitting laser has a slender structure, the edge emitting laser is prone to accidents such as dropping, shifting or shaking, and thus the setting of the sealant 27 is capable to hold the edge emitting laser, to prevent accidents such as dropping, displacement or shaking of the edge-emitting laser.

Figure 14:
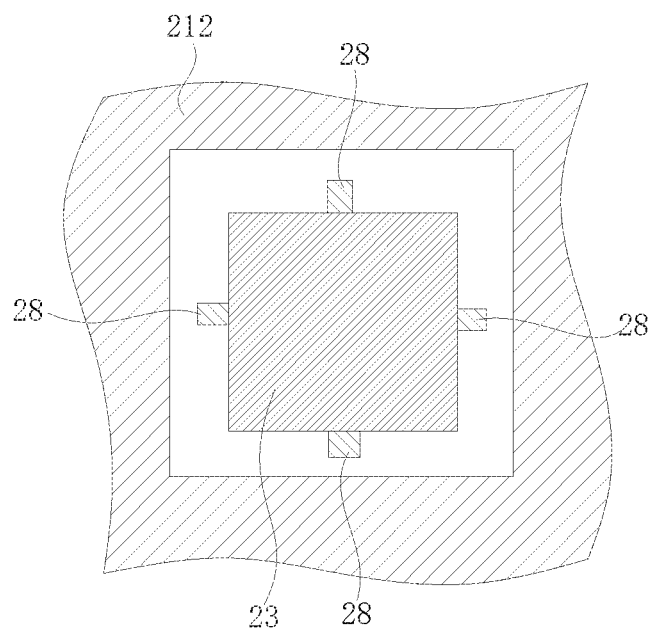

As illustrated in FIG. 11 and FIG. 14, in some embodiments, the light source 23 may also be fixed to the substrate component 21 in a fixed manner illustrated in FIG. 14. In detail, the laser projector 20 includes a plurality of support blocks 28. The plurality of support blocks 28 may be fixed to the substrate component 21. The plurality of support blocks 28 collectively surrounds the light source 23. The light source may be mounted directly between the plurality of support blocks 28 during installation. In one example, the plurality of support blocks 28 collectively clamp the light source 23 to further prevent the light source 23 from shaking.

In some embodiments, the protective cover 26 may be omitted. At this time, the diffractive optical element 25 may be disposed in the receiving cavity 221, and the diffractive emission plane 254 of the diffractive optical element 25 may be pressed against the top wall 222. The laser beam passes through the diffractive optical element 25 and then passes through the light through hole 2212. Thus, the diffractive optical element 25 is less likely to fall off.

In some embodiments, the substrate 211 may be omitted and the light source 23 may be directly bonded to the circuit board 212 to reduce overall thickness of the laser projector 20.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, such as two or three, unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A verification system, wherein the verification system is formed with a trusted execution environment, the verification system comprises a processor set and a micro-memory, and the processor set is configured to:
   obtain an infrared image to be verified of a target object;
   determine, in the trusted execution environment, whether the infrared image to be verified matches a pre-stored infrared template;
   in response to determining that the infrared image to be verified matches the pre-stored infrared template, obtain a depth image to be verified of the target object;
   determine, in the trusted execution environment, whether the depth image to be verified matches a pre-stored depth template;
   obtain a template infrared image of the target object and store the template infrared image into the micro-memory as the pre-stored infrared template;
   obtain a template depth image of the target object and store the template depth image into the micro-memory as the pre-stored depth template;
   control a laser projector to project laser light to the target object;

obtain a laser pattern after modulated by the target object;
process the laser pattern to obtain the template depth image;
obtain a plurality of laser pattern frames after modulated by the target object;
process the plurality of laser pattern frames to obtain a plurality of initial depth image frames; and
combine the plurality of initial depth image frames to obtain the template depth image.

2. The verification system according to claim 1, wherein the processor set is configured to:
control a laser projector to project laser light to the target object;
obtain a laser pattern after modulated by the target object; and
process the laser pattern to obtain the depth image to be verified.

3. The verification system according to claim 1, wherein the processor set comprises an application processor and a microprocessor, the application processor is formed with the trusted execution environment;
the microprocessor is configured to obtain the infrared image to be verified of the target object;
the application processor is configured to determine, in the trusted execution environment, whether the infrared image to be verified matches the pre-stored infrared template;
in response to determining that the infrared image to be verified matches the pre-stored infrared template, the microprocessor is further configured to obtain the depth image to be verified of the target object; and
the application processor is configured to determine, in the trusted execution environment, whether the depth image to be verified matches the pre-stored depth template, and to determine that the verification is successful in response to determining that the depth image to be verified matches the pre-stored depth template.

4. The verification system according to claim 3, wherein the application processor is further configured to:
in response to determining in the trusted execution environment that the infrared image to be verified does not match the pre-stored infrared template, determine that the verification is failed; or
in response to determining in the trusted execution environment that the depth image to be verified does not match the pre-stored depth template, determine that the verification is failed.

5. The verification system according to claim 1, wherein the processor set comprises a microprocessor, both the microprocessor and the micro-memory are configured to execute in the trusted execution environment, and the microprocessor is configured to:
obtain the infrared image to be verified of the target object;
determine whether the infrared image to be verified matches the pre-stored infrared template;
in response to determining that the infrared image to be verified matches the pre-stored infrared template, obtain the depth image to be verified of the target object;
determine whether the depth image to be verified matches the pre-stored depth template; and
in response to determining that the depth image to be verified matches the pre-stored depth template, determine that the verification is successful.

6. The verification system according to claim 5, wherein the microprocessor is further configured to:
determine that the verification is failed in response to determining that the infrared image to be verified does not match the pre-stored infrared template; or
determine that the verification is failed in response to determining that the depth image to be verified does not match the pre-stored depth template.

7. The verification system according to claim 1, wherein the verification system is further formed with a rich execution environment, the verification system is further configured to:
obtain a color image of the target object, and store the color image into the rich execution environment; and
obtain the color image from the rich execution environment, and control a display screen to display the color image.

8. The verification system according to claim 1, wherein the depth image to be verified is obtained based on a structured light principle, a time-of-flight principle, or a binocular stereo vision principle.

9. The verification system according to claim 1, wherein the processor set comprises a microprocessor and an application processor coupled to each other, the microprocessor is formed with the trusted execution environment, the pre-stored infrared template and the pre-stored depth template are stored in the trusted execution environment, and the microprocessor is configured to:
obtain the infrared image to be verified of the target object;
determine, in the trusted execution environment, whether the infrared image to be verified matches the pre-stored infrared template, to generate a first determination result, and send the first determination result to the application processor;
in response to determining that the first determination result is yes, obtain the depth image to be verified of the target object; and
determine, in the trusted execution environment, whether the depth image to be verified matches the pre-stored depth template, to generate a second determination result, and send the second determination result to the application processor.

10. The verification system according to claim 9, wherein the microprocessor is further configured to:
obtain a template infrared image of the target object and store the template infrared image into the trusted execution environment as the pre-stored infrared template; and
obtain a template depth image of the target object and store the template depth image into the trusted execution environment as the pre-stored depth template.

11. The verification system according to claim 10, wherein the microprocessor is further configured to:
control a laser projector to project laser light to the target object;
obtain a laser pattern after modulated by the target object; and
process the laser pattern to obtain the template depth image.

12. The verification system according to claim 11, wherein the microprocessor is further configured to:
obtain a plurality of laser pattern frames after modulated by the target object;
process the plurality of laser pattern frames to obtain a plurality of initial depth image frames; and combine the plurality of initial depth image frames to obtain the template depth image.

13. The verification system according to claim 10, wherein the application processor is formed with a rich execution environment, and the application processor is further configured to:
    obtain a color image of the target object and store the color image into the rich execution environment; and
    obtain the color image from the rich execution environment and control a display screen to display the color image.

14. The verification system according to claim 9, wherein the application processor is further configured to perform at least one of following actions:
    controlling an external device to prompt that the verification is failed in response to receiving the first determination result as no;
    controlling the external device to prompt that the verification is failed in response to receiving the second determination result as no;
    authorizing a current user with a first preset authority in response to receiving the first determination result as yes; or
    authorizing the current user with a second preset authority in response to receiving the second determination result as yes.

15. An electronic device, comprising:
    an infrared camera, configured to collect an infrared image of a target object;
    a laser projector, configured to project laser light to the target object; and
    a verification system, wherein the verification system is formed with a trusted execution environment, the verification system comprises a processor set and a micro-memory, the processor set is coupled to both the infrared camera and the laser projector, and the processor set is configured to:
        obtain an infrared image to be verified of a target object;
        determine, in the trusted execution environment, whether the infrared image to be verified matches a pre-stored infrared template;
        in response to determining that the infrared image to be verified matches the pre-stored infrared template, obtain a depth image to be verified of the target object;
        determine, in the trusted execution environment, whether the depth image to be verified matches a pre-stored depth template;
        obtain a template infrared image of the target object and store the template infrared image into the micro-memory as the pre-stored infrared template;
        obtain a template depth image of the target object and store the template depth image into the micro-memory as the pre-stored depth template;
        control a laser projector to project laser light to the target object;
        obtain a laser pattern after modulated by the target object;
        process the laser pattern to obtain the template depth image;
        obtain a plurality of laser pattern frames after modulated by the target object;
        process the plurality of laser pattern frames to obtain a plurality of initial depth image frames; and
        combine the plurality of initial depth image frames to obtain the template depth image.

16. A verification method executed by a processor set in a verification system, wherein the verification system is formed with a trusted execution environment, the verification system comprises a micro-memory, the verification method comprising:
    obtaining an infrared image to be verified of a target object;
    determining, in a trusted execution environment, whether the infrared image to be verified matches a pre-stored infrared template;
    in response to determining that the infrared image to be verified matches the pre-stored infrared template, obtaining a depth image to be verified of the target object;
    determining, in the trusted execution environment, whether the depth image to be verified matches a pre-stored depth template;
    in response to determining that the depth image to be verified matches the pre-stored depth template, determining that the verification is successful;
    obtaining a template infrared image of the target object and store the template infrared image into the micro-memory as the pre-stored infrared template;
    obtaining a template depth image of the target object and store the template depth image into the micro-memory as the pre-stored depth template;
    controlling a laser projector to project laser light to the target object;
    obtaining a laser pattern after modulated by the target object;
    processing the laser pattern to obtain the template depth image;
    obtaining a plurality of laser pattern frames after modulated by the target object;
    processing the plurality of laser pattern frames to obtain a plurality of initial depth image frames; and
    combining the plurality of initial depth image frames to obtain the template depth image.

17. The verification method according to claim 16, wherein obtaining the depth image to be verified of the target object comprises:
    controlling a laser projector to project laser light to the target object;
    obtaining a laser pattern after modulated by the target object; and
    processing the laser pattern to obtain the depth image to be verified.

* * * * *